US011017321B1

(12) United States Patent
Mishra et al.

(10) Patent No.: US 11,017,321 B1
(45) Date of Patent: May 25, 2021

(54) MACHINE LEARNING SYSTEMS FOR AUTOMATED EVENT ANALYSIS AND CATEGORIZATION, EQUIPMENT STATUS AND MAINTENANCE ACTION RECOMMENDATION

(71) Applicant: Accenture Global Solutions Limited, Dublin (IE)

(72) Inventors: Rabinarayan Mishra, Bangalore (IN); Susarla Aditya, Bangalore (IN); Subrahmanyam Vadrevu, Hyderabad (IN); Jan Andre Nicholls, West Molesey (GB); Joel Titus, Sivaganga District (IN); Seshasai Rujuroop Kandrakota, Hyderabad (IN)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 17/102,425

(22) Filed: Nov. 23, 2020

(51) Int. Cl.
*G06N 20/00* (2019.01)
*G06F 3/0484* (2013.01)

(52) U.S. Cl.
CPC ......... *G06N 20/00* (2019.01); *G06F 3/04842* (2013.01)

(58) Field of Classification Search
USPC ....................................................... 706/12
See application file for complete search history.

(56) References Cited

U.S. PATENT DOCUMENTS

| | | | | | |
|---|---|---|---|---|---|
| 5,581,464 A | * | 12/1996 | Woll | ..................... | G01S 13/931 701/33.3 |
| 5,742,915 A | * | 4/1998 | Stafford | ................. | G07C 5/008 340/438 |
| 6,078,874 A | * | 6/2000 | Piety | ..................... | G01H 1/003 702/122 |
| 6,898,737 B2 | * | 5/2005 | Goeller | ............... | G06F 11/0748 714/39 |
| 6,925,454 B2 | * | 8/2005 | Lam | ..................... | G06Q 10/063 706/45 |
| 8,473,143 B2 | * | 6/2013 | Stark | .................... | G07C 5/0891 701/28 |
| 8,875,286 B2 | * | 10/2014 | Friedrichs | ........... | H04L 63/1416 726/22 |
| 9,088,601 B2 | * | 7/2015 | Friedrichs | ............. | G06F 21/564 |

(Continued)

*Primary Examiner* — Michael B Holmes
(74) *Attorney, Agent, or Firm* — Norton Rose Fulbright US LLP

(57) ABSTRACT

Aspects of the present disclosure provide systems, methods, and computer-readable storage media that leverage artificial intelligence and machine learning to analyze and categorize events associated with an equipment asset, such as industrial machinery, to determine a status (e.g., insight) associated with the equipment asset, and to determine maintenance actions to be performed with respect to the equipment asset to prevent, or reduce the likelihood or severity of, occurrence of a fault at the equipment asset. Machine learning (ML) models may be trained to categorize events that are detected based on operating characteristics data associated with the equipment asset, to determine a status of the equipment asset, and to recommend one or more maintenance actions (or other actions). Output that indicates the maintenance actions may be displayed to a user or used to automatically initiate performance of one or more of the maintenance actions.

20 Claims, 5 Drawing Sheets

(56) References Cited

U.S. PATENT DOCUMENTS

| | | | |
|---|---|---|---|
| 9,092,802 B1 * | 7/2015 | Akella | G06Q 30/0256 |
| 9,189,746 B2 * | 11/2015 | Zhu | G06F 21/552 |
| 9,672,355 B2 * | 6/2017 | Titonis | G06N 20/00 |
| 10,476,742 B1 * | 11/2019 | Szarvas | H04L 41/0896 |
| 10,514,977 B2 * | 12/2019 | Jones | G06F 11/079 |

* cited by examiner

MACHINE LEARNING SYSTEMS FOR AUTOMATED EVENT ANALYSIS AND CATEGORIZATION, EQUIPMENT STATUS AND MAINTENANCE ACTION RECOMMENDATION

TECHNICAL FIELD

The present disclosure relates to systems and methods for leveraging machine learning and artificial intelligence to automatically analyze and categorize events, recommend equipment status (e.g., "insights") based on the events, and generate commands or recommendations for maintenance actions based on the equipment status for performance with respect to equipment assets, such as industrial machinery.

BACKGROUND

Technology advancements have resulted in deployment and adoption of automated, or semi-automated, equipment in many industries. For example, equipment asset-intensive industries, such as oil and gas, mining, metals, and manufacturing, have invested significant amounts of capital in at least partially automated industrial machinery to improve operational efficiency and reduce costs. The industrial machinery, or other equipment assets, are often monitored by sensors configured to measure operating characteristics of the industrial machinery. One area in which such industries may further improve efficiency and reduce costs is equipment asset maintenance and reliability, such as through proactive and/or predictive maintenance. Predictive maintenance refers to various techniques for maintaining industrial machinery or other equipment assets, such as predicting faults associated with industrial machinery before the faults occur and performing maintenance to prevent, or reduce the impact of, the faults. Additionally, predictive maintenance can include identifying issues that may result in future faults and performing maintenance to resolve the issues or otherwise prepare for the future faults before their occurrence. By preventing faults or performing maintenance on equipment assets before a fault increases in severity, downtime of equipment assets may be reduced or prevented, which may prevent significant revenue losses and monetary expenditures in addition to extending the operational lifetime of the equipment assets.

One source of unplanned downtime is equipment health degradation. To reduce this unplanned downtime, an entity may employ engineers (or others) to analyze operation characteristic data that is received from the equipment assets, or sensors monitoring the equipment assets, to identify events that indicate an operating state or status that is a precursor to a fault. For example, an engineer monitoring an oil rig may identify that the oil rig is operating in an overheated state based on temperature measurements being within a particular temperature range (e.g., an event). Using the engineer's insight (e.g., experience, training, and study), the engineer may determine a maintenance action to perform on the oil rig to transition the oil rig out of the overheated state before a fault occurs, or before a fault increases in severity.

Although such predictive maintenance may prevent some faults, the success of the predictive maintenance is based on the engineer's experience and knowledge. For example, if the engineer has not observed the relationship between an event and a particular operating state of the equipment asset, the engineer may not recognize the opportunity for predictive maintenance until a fault actually occurs. This may be especially likely if seemingly unrelated events are indicative of an operating state or status that is a precursor to a particular type of fault. Also, as industrial workforces continue to increase in age, engineers with many years of experience and knowledge may retire and be replaced with younger engineers that may lack the breadth and depth of knowledge as their more experienced colleagues. Additionally, as technology advances, the quantity of operating characteristics data that is measured for equipment assets increases exponentially. As the quantity of operating characteristics data for the engineers to analyze increases, the engineers may be overwhelmed by the sheer number of events to be monitored, many of which have little predictive value. This increase in quantity of events to monitor degrades the engineers' ability to recognize important events (e.g., events that are highly predictive of an operating state or status that is a precursor to a fault), resulting in missed opportunities for predictive maintenance and increased number of faults in the equipment assets. Thus, downtime and repair costs for the equipment assets may increase, thereby reducing revenue and harming the business reputation of the entity that owns or operates the equipment assets.

SUMMARY

The present application discloses systems, methods, and computer-readable storage media that leverage artificial intelligence and machine learning techniques to analyze and categorize events associated with an equipment asset, such as industrial machinery, to recommend a status of the equipment asset based on the events, and to determine and recommend maintenance actions to be performed with respect to the equipment asset to prevent, or reduce the likelihood or severity of, occurrence of a fault at the equipment asset. Historical operating characteristics data, historical events, and previously-issued work orders may be analyzed by one or more engineers (or other equipment experts), one or more automated processes, or a combination thereof, to generate a "knowledge base" of information that indicates relationships between events and "insights" (e.g., statuses of the equipment asset, such as an operating state of the equipment asset, a condition experienced by the equipment asset, a root cause of the operating state or condition, a potential impact of the condition, such as a likelihood of a fault occurring or a degree of severity of such a fault, or the like), relationships between insights and maintenance actions, or other actions, performed at the equipment asset to remedy the condition or prevent a fault, ratings of events (e.g., ratings that indicate the strength of a relationship between an event and an insight, an impact of actions associated with the insight, or a combination thereof), ratings of the maintenance actions, value generated by performance of the maintenance action (e.g., value generated by performance of a work order), or a combination thereof. After generating the knowledge base, current operating characteristics data that is generated by sensors configured to monitor the equipment asset, events detected by one or more applications configured to detect events from the operating characteristics data, or both may be analyzed using described artificial intelligence and machine learning processes to categorize events indicated by the operating characteristics data. Additionally, the operating characteristics data and high-priority events (e.g., "worthy" events) may be analyzed using artificial intelligence and machine learning processes to determine a status (e.g., an insight) associated with the equipment asset, and based on the determined status, one or more maintenance actions (or other actions, referred to as "worthy actions" or "next best actions") may be determined for performance at the equipment asset to prevent occurrence of a fault corresponding to the status, to reduce severity of the fault, or the like. Results of performance of the maintenance actions, such as value provided by performance of the maintenance actions, may be used to improve the performance of the determinations and to enable dynamic adaptation to changing conditions at the equipment asset.

In one aspect a monitoring device (e.g., a control panel, a server, a user device, or the like) may receive operating characteristics data from sensors configured to monitor an equipment asset. The monitoring device may detect events based on the operating characteristics data, and the monitoring device may provide the operating characteristics data and the detected events as input data to a first set of one or more machine learning (ML) models that are configured to group the events into clusters based on categories, such as priorities, of the events. One such cluster may correspond to priority/worthy events (e.g., events that are associated with maintenance actions that have a significant impact on performance of the equipment asset, such as a significant likelihood to prevent occurrence of a fault). The first set of ML models may include or correspond to neural networks (NNs), support vector machines (SVMs), decision trees, random forests, regression models, Bayesian networks (BNs), dynamic Bayesian networks (DBNs), naive Bayesian (NB) models, Gaussian processes, hidden Markov models (IMMIs), and the like, that are configured to perform clustering. The first set of ML models may be trained using training data that is generated based on historical operating characteristics data, historical event data, ratings associated with historical events (e.g., from the knowledge base), and the like. Alternatively, the detected events and the operating characteristics data may be compared to a list of priority events from the knowledge base (e.g., priority events that are identified based on input from engineers or other experts, analysis performed by the system, or a combination thereof).

After identifying the priority events, the monitoring device may provide the operating characteristics data and the priority events as second input data to a second set of one or more ML models that are configured to determine an "insight," such as a status, associated with the equipment asset. As used herein, a status of the equipment asset may include or correspond to an operating state of the equipment asset, an issue or condition experienced by the equipment asset, a root cause associated with the condition, an impact of the condition, or a combination thereof. The status may be a precursor to a particular fault which may result in downtime of the equipment asset. The second set of ML models may include or correspond to NNs, SVMs, decision trees, random forests, regression models, BNs, DBNs, NB models, Gaussian processes, HMMs, and the like, that are configured to perform classification based on the priority events and the operating characteristics data. The second set of ML models may be trained using training data that is generated based on historical operating characteristics data, historical event data, statuses (e.g., insights) associated with the historical events and operating characteristics, and the like.

After determining the status (e.g., insight), the monitoring device may provide the operating characteristics data, the priority events, and the status as third input data to a third set of one or more ML models that are configured to determine maintenance actions to be performed at the equipment asset. The maintenance actions (or other actions) may be configured to prevent occurrence of, or reduce a severity of, a fault at the equipment asset, and the maintenance actions may be performed by a user, automatically initiated by the monitoring device, or a combination thereof. As a non-limiting example, the maintenance actions may include tightening a valve, increasing a fluid rate, adding insulation, and the like. The third set of ML models may include or correspond to NNs, SVMs, decision trees, random forests, regression models, BNs, DBNs, NB models, Gaussian processes, HMMs, and the like, that are configured to perform classification based on the operating characteristics data, the events, and the insight. The third set of ML models may be trained using training data that is generated based on historical operating characteristics data, historical work orders (e.g., data indicative of previously performed maintenance actions), historical event data, historical insight-action relationship data, and the like. After determination of one or more maintenance actions, the monitoring device may generate an output that indicates at least the one or more actions. As a particular example, the monitoring device may provide an output to a display device to cause the display device to display the one or more maintenance actions, as well as other information. As another particular example, the monitoring device may transmit an instruction to a control system of the equipment asset to initiate performance of the one or more maintenance actions.

The present disclosure describes systems that provide improvements compared to other event analysis systems. For example, the present disclosure describes systems that automatically categorize events and identify priority events using deep machine learning based on an extensive knowledge base. The priority events may be impossible to detect by engineers or other experts due to the large quantity of operating characteristics data and events that are received and identified. Additionally, the systems disclosed herein are configured to determine/recommend equipment status (e.g., insights) based on priority events, and to determine/recommend maintenance actions based on the equipment status, automatically using deep machine learning. A detailed knowledge base storing information related to operation of the equipment asset may also be generated and maintained for use in training the ML models or performing any of the described operations. Thus, the systems of the present disclosure may leverage expert knowledge, measured data, and other information to identify/recommend maintenance actions (or other actions) that provide the greatest impact to preventing faults in real-time and with little to no user input. These systems may determine the maintenance actions with greater speed, utilizing less human resources, than conventional event detection systems that typically detect events and display the events to a user without automatically categorizing the events, identifying insights based on the events, or recommending actions based on the insights. Additionally, the recommended maintenance actions may be more likely to prevent faults or compensate for issues at the equipment asset than conventional scheduled maintenance actions or maintenance actions determined by a human engineer. Preventing faults at the equipment asset may reduce or prevent unplanned downtime of the equipment asset, which may enable on-time and on-budget completion of a project by an entity that owns or operates the equipment asset, as well as prolonging the operational lifetime of the equipment asset. Preventing delays or disruptions due to unplanned downtime of the equipment asset may also prevent significant revenue loss and degradation of the business reputation of the entity.

In a particular aspect, a method for event categorization and maintenance action recommendation using machine learning includes receiving, by one or more processors, operating characteristics data associated with industrial machinery and event data indicating events detected based on the operating characteristics data. The method also includes identifying, by the one or more processors, one or more priority events associated with the industrial machinery based on the event data and the operating characteristics data. The method includes providing, by the one or more processors, first input data based on the one or more priority events to a first machine learning (ML) model to identify a status associated with the industrial machinery. The first ML model is configured to determine statuses associated with the industrial machinery based at least in part on events associated with the industrial machinery. The method includes providing, by the one or more processors, second input data based on the status associated with the industrial machinery to a second ML model to determine a maintenance action to be performed with respect to the industrial machinery. The second ML model is configured to determine maintenance actions to be performed at the industrial machinery based at least in part on statuses associated with the industrial machinery. The method further includes generating, by the one or more processors, an output that indicates maintenance action.

In another particular aspect, a non-transitory computer-readable storage medium stores instructions that, when executed by one or more processors, cause the one or more processors to perform operations for event categorization and maintenance action recommendation using machine learning. The operations include receiving operating characteristics data associated with industrial machinery and event data indicating events detected based on the operating characteristics data. The operations also include identifying one or more priority events associated with the industrial machinery based on the event data and the operating characteristics data. The operations include providing first input data based on the one or more priority events to a first ML model to identify a status associated with the industrial machinery. The first ML model is configured to determine statuses associated with the industrial machinery based at least in part on events associated with the industrial machinery. The operations include providing second input data based on the status associated with the industrial machinery to a second ML model to determine a maintenance action to be performed with respect to the industrial machinery. The second ML model is configured to determine maintenance actions to be performed at the industrial machinery based at least in part on statuses associated with the industrial machinery. The operations further include generating an output that indicates maintenance action.

In another particular aspect, a system for event categorization and maintenance action recommendation using machine learning includes a memory and one or more processors communicatively coupled to the memory. The one or more processors are configured to receive operating characteristics data associated with an equipment asset and event data indicating events detected based on the operating characteristics data. The one or more processors are also configured to identify one or more priority events associated with the equipment asset based on the event data and the operating characteristics data. The one or more processors are configured to provide first input data based on the one or more priority events to a first ML model to identify a status associated with the equipment asset. The first ML model is configured to determine statuses associated with the equipment asset based at least in part on events associated with the equipment asset. The one or more processors are configured to provide second input data based on the status associated with the equipment asset to a second ML model to determine a maintenance action to be performed with respect to the equipment asset. The second ML model is configured to determine maintenance actions to be performed at the equipment asset based at least in part on statuses associated with the equipment assets. The one or more processors are further configured to generate an output that indicates maintenance action.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, and computer-readable storage media for automated event categorization and equipment status (e.g., insight) and maintenance action recommendation using machine learning for use with equipment assets, such as industrial machinery. Detected events based on operation characteristics data may be prioritized (or otherwise categorized), and equipment statuses (which include operating states, other insights, or both) may be determined/recommended based on priority events, using artificial intelligence and machine learning techniques. The equipment status (e.g., insights) may be used by artificial intelligence and machine learning techniques to determine/recommend one or more maintenance actions (or other actions) to be performed at the equipment assets. The various artificial intelligence and machine learning structures may be trained using a "knowledge base" that is generated and maintained to store event-status-action data that indicates relationships between historical detected events or historical operating characteristics and equipment statuses, rankings or prioritizations of detected events, relationships between historical equipment statuses and maintenance actions (e.g., as indicated by work orders associated with the equipment assets), ranking or impact of the maintenance actions (e.g., value provided by performance of the work orders), and the like, which may be generated, organized, and categorized based on input from one or more human engineers or other equipment experts, one or more automatic analysis operations, or a combination thereof. Using artificial intelligence and machine learning to categorize events, determine/recommend equipment statuses, and recommend maintenance actions may use less human resources and provide more successful maintenance actions than other event detection systems that require display detected events to users and require substantial human interaction to analyze the events. Additionally, performance of the maintenance actions may be monitored and the results fed back for use in further training of the machine learning and artificial intelligence models, thereby enabling improved performance as new information is received and dynamic adaptation based on changes to the equipment assets.

Figure 1:
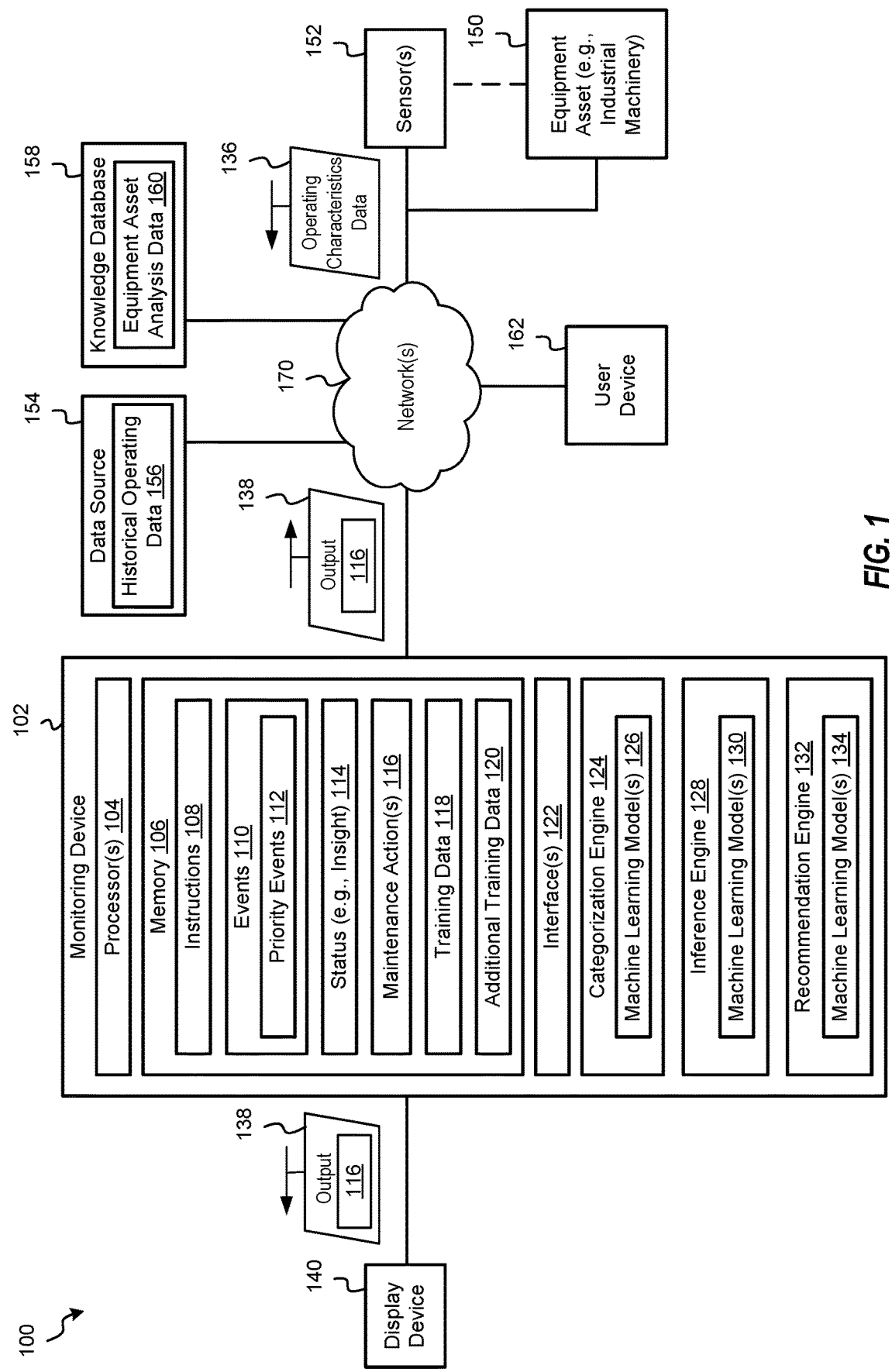
FIG. 1 is a block diagram of an example of a system for event categorization and equipment status and maintenance action recommendation using machine learning according to one or more aspects.

Referring to FIG. 1, an example of a system for event categorization and equipment status and maintenance action recommendation using machine learning according to one or more aspects is shown as a system 100. The system 100 may be configured to receive operating characteristics data provided by sensors monitoring an equipment asset and event data indicating events detected based on the operating characteristics data, to categorize the events (e.g., by priority), and to determine/recommend a status of the equipment asset (e.g., an insight) based on priority events. The status may be displayed to a user to enable affirmation, modification, or rejection of the status. The system 100 may be further configured to recommend one or more maintenance actions (or other actions) to be performed at the equipment asset to prevent a fault and, if the maintenance actions are capable of automatic performance, initiate performance of the maintenance actions. As used herein, an "equipment asset" may refer to any type of equipment, in any size, instance, or configuration (e.g., a "piece of equipment"), such as devices, systems, components, and the like, that may be owned or operated by an operator of the system 100, a client of the operator of the system 100, another entity, or a combination thereof. As used herein, an equipment status or status of an equipment asset may refer to any equipment-related insight that may be inferred, predicted, recommended or determined based on detected events, operating characteristics of the equipment asset, other information, or a combination thereof. As non-limiting examples, the status may include or correspond to an operating state of the equipment asset, an issue or condition experienced by the equipment asset, a root cause of the issue or condition, an impact or severity of the issue or condition (e.g., a likelihood of the issue, condition, or operating state being a precursor to a fault, a severity of a fault that may occur or that has already occurred, a severity of a non-fault issue or condition, or the like), other insights, or a combination thereof. As such, status, or equipment status, and insight may be used interchangeably throughout the disclosure. Although referred to as maintenance actions, in other implementations, the actions recommended by the system 100 (and other systems, devices, and methods of the present disclosure) may include repair actions (e.g., actions to correct an identified fault or other undesired condition), actions to maintain a current operating state or status, or to prolong the operating lifetime, of an equipment asset, actions to prevent or reduce the likelihood or severity of a fault at an equipment asset, other equipment-related actions, and the like.

As shown in FIG. 1, the system 100 includes a monitoring device 102, a display device 140, an equipment asset 150, one or more sensors 152, a data source 154, a knowledge database 158, a user device 162, and one or more networks 170. The monitoring device 102 includes or corresponds to a computing device configured to monitor operations of the equipment asset 150, such as a monitoring station or console, a desktop computer, a laptop computer, a mobile device (e.g., a smart phone, a tablet computer, a wearable device, and the like), or a server, as non-limiting examples. The monitoring device 102 includes one or more processors 104, a memory 106, one or more communication interfaces 122, a categorization engine 124, an inference engine 128, and a recommendation engine 132. It is noted that functionalities described with reference to the monitoring device 102 are provided for purposes of illustration, rather than by way of limitation and that the exemplary functionalities described herein may be provided via other types of computing resource deployments. For example, in some implementations, computing resources and functionality described in connection with the monitoring device 102 may be provided in a distributed system using multiple servers or other computing devices, or in a cloud-based system using computing resources and functionality provided by a cloud-based system using computing resources and functionality provided by a cloud-based environment that is accessible over a network, such as the one of the one or more networks 170. To illustrate, one or more operations described herein with reference to the monitoring device 102 may be performed by one or more servers or a cloud-based system that communicate with one or more user devices, such as the user device 162.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the monitoring device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the monitoring device 102 may be stored in the memory 106 as instructions 108 that, when executed by the one or more processors 104, cause the one or more processors 104 to perform the operations described herein with respect to the monitoring device 102, as described in more detail below. Additionally, the memory 106 may be configured to store data, such as (or representative of) events 110, a status 114, one or more maintenance actions 116, training data 118, and additional training data 120. Exemplary aspects of the events 110, the status 114, the maintenance actions 116, the training data 118, and the additional training data 120 are described in more detail below.

The one or more communication interfaces 122 may be configured to communicatively couple the monitoring device 102 to the one or more networks 170 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the monitoring device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the monitoring device 102. In some implementations, the monitoring device 102 is coupled to the display device 140, such as a monitor, a display (e.g., a liquid crystal display (LCD) or the like), a touch screen, a projector, a virtual reality (VR) display, an augmented reality (AR) display, an extended reality (XR) display, or the like. Although shown as external to the monitoring device 102 in FIG. 1, in some other implementations, the display device 140 is included in or integrated in the monitoring device 102.

The categorization engine 124 may be configured to receive input data that indicates operating characteristics associated with the equipment asset 150 and event data indicating the events 110 and to group the events 110 into clusters representing categories of events associated with the equipment asset 150. To illustrate, the monitoring device 102 may receive operating characteristics data 136 from the sensors 152, which may be used to generate input data that is provided to the categorization engine 124. The operating characteristics data 136, which may also be referred to herein as operating conditions data, may indicate various operating characteristics or sensor readings associated with the equipment asset 150, such as temperatures, pressures, vibrations, and the like, as non-limiting examples. The events 110 may be detected based on the operating characteristics data 136, such as by one or more event detection applications executed by the monitoring device 102 or by other devices communicatively coupled to the monitoring device 102. For example, the events 110 may include a temperature of a particular component exceeding a temperature threshold or a differential pressure between two components failing to satisfy a pressure threshold, as non-limiting examples. The monitoring device 102 may extract features from the operating characteristics data 136 and the events 110 to generate the input data for the categorization engine 124. In some implementations, generating the input data may include performing pre-processing on the operating characteristics data 136 and the events 110, extracting predetermined features from the operating characteristics data 136 and the events 110, or a combination thereof, as further described herein with reference to FIG. 2.

The categorization engine 124 may group the events 110 (or the operating characteristics that indicate the events 110) into clusters of different categories. In some implementations, the categories represent priorities of events with respect to performing preventative maintenance actions on the equipment asset 150. The priorities of the events may represent the likelihood that the events are indicative of a status of the equipment asset 150 that is a precursor to a fault (or to increased severity of a fault). For example, a first cluster may represent "priority events" (also referred to as "meaningful events") that have a high likelihood of being indicative of a status that is a precursor to a fault (or some other status associated with one or more recommended actions), a second cluster may represent "routine events" (also referred to as "low priority events") that have a small likelihood of being indicative of a status that is precursor to a fault, and a third cluster may represent "non-categorized events" for which the predictive value with respect to a status that is a precursor to a fault is not sufficiently analyzed, as non-limiting examples. Additionally or alternatively, the priorities may represent the impact of associated maintenance actions (e.g., maintenance actions associated with an equipment status that is related to the events) on preventing, or reducing the severity of, a fault at the equipment asset 150. Clustering of events may be based on analysis of historical operating characteristics data associated with the equipment asset 150, equipment specifications associated with the equipment asset 150, historical event data, user input, other information, or a combination thereof. In some implementations, the categorization engine 124 may be configured to perform k-means clustering to cluster the events based on the priorities (e.g., the predictive values) of the events. Alternatively, the categorization engine 124 may be configured to perform other types of clustering, such as Gaussian mixture model (GMM) clustering, automatic relevance determination (ARD), nearest-neighbors clustering, and the like. Alternatively, the categorization engine 124 may compare the events 110 to a list of priority events (e.g., a predetermined list) received from the knowledge database 158, and one or more of the events 110 that match events included in the list of priority events may be categorized as the priority events 112.

In some implementations, to perform the clustering of the events, the categorization engine 124 may use one or more machine learning (ML) models 126 (referred to herein as ML models 126), which may be included in or accessible to the categorization engine 124 (e.g., via storage at the memory 106). For example, the ML models 126 may be configured to receive input data based on the events 110 and the operating characteristics data 136 and to group the events 110 into clusters based on the priorities of the events. In some implementations, the ML models 126 may be trained to perform k-means clustering, or other unsupervised learning processes, based on input data to group detected events into clusters that share similar priority (e.g., impact of associated maintenance actions or predictive value of the events associated with equipment statuses). The ML models 126 may include a single ML model or multiple ML models configured to perform the clustering. In some implementations, the ML models 126 may include or correspond to one or more support vector machines (SVMs) or one or more naive Bayes (NB) models. In other implementations, the ML models 126 may include or correspond to other types of ML models or constructs, such as neural networks (NNs), decision trees, random forests, regression models, Bayesian networks (BNs), dynamic Bayesian networks (DBNs), Gaussian processes, hidden Markov models (HMMs), and the like. The monitoring device 102 may train the ML models 126 to perform clustering, or the ML models 126 may be pre-trained and received by the monitoring device 102 from another source.

In some implementations, the monitoring device 102 may be configured to train the ML models 126 using the training data 118 prior to clustering events. For example, the monitoring device 102 may provide first training data of the training data 118 to the ML models 126 to train the ML models 126 to cluster events based on priorities of the events using supervised learning, semi-supervised learning, unsupervised learning, or a combination thereof. The first training data may be based on historical operating characteristics data associated with the equipment asset 150, equipment specifications associated with the equipment asset 150, historical operating characteristics data associated with similar types of equipment as the equipment asset 150, historical event data associated with the equipment asset 150, historical event data associated with similar types of equipment as the equipment asset 150, event rankings data, vendor information, user input (e.g., based on engineers/ technicians knowledge and experience), other information, or a combination thereof. For example, any of the above-described data may be received from the knowledge database 158, which is configured to maintain a knowledge base of equipment-related information, as further described below. In some implementations, the monitoring device 102 may generate labelled training data for use in training the ML models 126. For example, the first training data may include labelled historical operating characteristics data associated with the equipment asset 150, labelled historical operating characteristics data associated other equipment assets that are similar to the equipment asset 150, labelled historical event data associated with the equipment asset 150, labelled historical event data associated with other equipment that are similar to the equipment asset 150, or a combination thereof. The labels of this labelled historical operating characteristics data or labelled historical event data may indicate observed or identified events corresponding to the respective labelled historical operating characteristics data, ranks (e.g., priorities) associated with the respective labelled historical event data, or a combination thereof. For example, training data based on a particular event (or operating characteristics that indicate the particular event) may be labelled with an indication of the priority associated with the particular event (e.g., a category of the impact of associated maintenance actions or a predictive value of the event). In some implementations, the monitoring device 102 may receive historical operating data 156 from the data source 154 for use in generating the first training data. In some implementations, training the ML models 126 may include tuning one or more hyper-parameters of one or more ML models, ensembling multiple ML models, other techniques, or a combination thereof, and selecting one or more highest performing ML models for inclusion in the ML models 126 based on results of clustering events in test data, as further described with reference to FIG. 3.

The inference engine 128 may be configured to determine statuses associated with the equipment asset 150 based on input data that indicates events indicated by the operating characteristics data 136. Determining statuses may also be referred to herein as determining "insights" or "inferences" associated with the equipment asset 150. To illustrate, the monitoring device 102 may be configured to generate input data that indicates one or more priority events indicated by the categorization engine 124 and, optionally, at least a portion of the operating characteristics data 136, and the monitoring device 102 may provide the input data to the inference engine 128 to determine a status associated with the equipment asset 150. The inference engine 128 may classify the one or more priority events as being associated with a particular status of the equipment asset 150 that is a precursor to a fault (or an increase in severity of a fault). As an illustrative example, if the categorization engine 124 identifies a first event corresponding to a valve pressure exceeding a pressure threshold and a second event corresponding to a valve temperature exceeding a temperature threshold, the inference engine 128 may determine that a status of the equipment asset 150 corresponds to a valve being subject to mechanical stress due to an undesirable temperature. As shown by this example, the status may include an operating state or condition experience by the equipment asset 150 (e.g., that the valve is subject mechanical stress) and a root cause of the operating state or the condition (e.g., the undesirable temperature). This status may be a precursor to a fault, as the valve may fail if subject to mechanical stress for a particular time period. Classification of the events into statuses may be based on analysis of historical operating characteristics data associated with the equipment asset 150, equipment specifications associated with the equipment asset 150, historical event data associated with the equipment asset 150, historical status (e.g., insight) data associated with the equipment asset 150, user input, other information, or a combination thereof.

To perform the classification of the events, the inference engine 128 may use one or more ML models 130 (referred to herein as ML models 130), which may be included in or accessible to the inference engine 128 (e.g., via storage at the memory 106). For example, the ML models 130 may be configured to receive input data based on the priority events and at least a portion of the operating characteristics data 136 and to classify the events into status. In some implementations, the ML models 130 may be trained to perform supervised learning using historical operating characteristics data to classify events as being associated with various statuses of the equipment asset 150. The ML models 130 may include a single ML model or multiple ML models configured to perform the classification. In some implementations, the ML models 130 may include or correspond to one or more SVMs or one or more NB models. In other implementations, the ML models 130 may include or correspond to other types of ML models or constructs, such as NNs, decision trees, random forests, regression models, BNs, DBNs, Gaussian processes, HMMs, and the like. The monitoring device 102 may train the ML models 130 to perform classification, or the ML models 130 may be pre-trained and received by the monitoring device 102 from another source.

In some implementations, the monitoring device 102 may be configured to train the ML models 130 using the training data 118 prior to classifying events. For example, the monitoring device 102 may provide second training data of the training data 118 to the ML models 130 to train the ML models 130 to classify events as being associated with statuses using supervised learning, semi-supervised learning, unsupervised learning, or a combination thereof. The second training data may be based on historical event data associated with the equipment asset 150, equipment specifications associated with the equipment asset 150, historical event data associated with similar types of equipment as the equipment asset 150, historical status data associated with the equipment asset 150, vendor information, user input (e.g., based on engineers/technicians knowledge and experience), other information, or a combination thereof. For example, any of the above-described data may be received from the knowledge database 158, which may maintain such data, as further described below. In some implementations, the monitoring device 102 may generate labelled training data for use in training the ML models 130. For example, the second training data may include labelled historical event data associated with the equipment asset 150, labelled historical event data associated other equipment assets that are similar to the equipment asset 150, labelled historical status data associated with the equipment asset 150, labelled historical status data associated with other equipment that are similar to the equipment asset 150, equipment specifications associated with the equipment asset 150, or a combination thereof. The labels of this labelled historical event data may indicate observed or determined statuses corresponding to the respective labelled historical event data. For example, training data based on a particular event (or operating characteristics that indicate the particular event) may be labelled with an indication of the status associated with the particular event. In some implementations, the monitoring device 102 may receive the historical event data from the data source 154 for use in generating the second training data. In some implementations, training the ML models 130 may include tuning one or more hyper-parameters of one or more ML models, ensembling multiple ML models, other techniques, or a combination thereof, and selecting one or more highest performing ML models for inclusion in the ML models 130 based on results of clustering events in test data, as further described with reference to FIG. 3.

The recommendation engine 132 may be configured to determine one or more maintenance actions to be performed with respect to the equipment asset 150 based on the status determined by the inference engine 128. To illustrate, the monitoring device 102 may be configured to generate input data that indicates a status indicated by the inference engine 128 and, optionally, at least a portion of the operating characteristics data 136, and the monitoring device 102 may provide the input data to the recommendation engine 132 to determine one or more maintenance actions to be performed at the equipment asset 150. The recommendation engine 132 may determine the maintenance actions to prevent the occurrence of a particular fault that the status is a precursor to a fault. As an illustrative example, if the inference engine 128 determines that a status of the equipment asset 150 corresponds to a valve being subject to mechanical stress due to an undesirable temperature, the maintenance action may include reducing a flow through the valve to lower the temperature or replacing the valve within a particular time period before failure due to the mechanical stress. This maintenance action may prevent failure of the valve (e.g., a fault). Determination of the maintenance actions may be based on analysis of historical repair data associated with the equipment asset 150 (e.g., work orders associated with the equipment asset 150), and historical operating characteristics data indicating results of the historical repairs (e.g., maintenance actions), historical status data associated with the equipment asset 150, user input, other information, or a combination thereof.

To determine the maintenance actions, the recommendation engine 132 may use one or more ML models 134 (referred to herein as ML models 134), which may be included in or accessible to the recommendation engine 132 (e.g., via storage at the memory 106). For example, the ML models 134 may be configured to receive input data based on the status (e.g., insight) determined by the inference engine 128 and at least a portion of the operating characteristics data 136 and to determine the maintenance actions based on the input data. In some implementations, the ML models 134 may be trained to perform supervised learning using historical repair data and historical operating characteristics data to classify statuses as being associated with various maintenance actions to be performed at the equipment asset 150. In some implementations, the ML models 134 may be trained to determine "worthy actions" (e.g., maintenance actions that are associated with a particular success rate or impact on the operating characteristics of the equipment asset 150) such that recommendation engine 132 recommends the most efficient maintenance actions for preventing a fault, or otherwise reducing the severity of a fault, at the equipment asset 150. For example, the ML models 134 may be configured to classify statuses to related maintenance actions, and to cluster the maintenance actions into groups based on priority (e.g., impact or "worthiness"). In such examples, maintenance actions that are grouped into a high priority cluster may be output by the ML models 134. The ML models 134 may include a single ML model or multiple ML models configured to determine the maintenance actions. In some implementations, the ML models 134 may include or correspond to one or more SVMs, one or more NB models, or one or more deep NNs. In other implementations, the ML models 134 may include or correspond to other types of ML models or constructs, such as NNs, decision trees, random forests, regression models, BNs, DBNs, Gaussian processes, HMMs, and the like. The monitoring device 102 may train the ML models 134 to determine the maintenance actions, or the ML models 134 may be pre-trained and received by the monitoring device 102 from another source.

In some implementations, the monitoring device 102 may be configured to train the ML models 134 using the training data 118 prior to determining maintenance actions. For example, the monitoring device 102 may provide third training data of the training data 118 to the ML models 134 to train the ML models 134 to determine maintenance events based on the statuses using supervised learning, semi-supervised learning, unsupervised learning, or a combination thereof. The third training data may be based on historical status data associated with the equipment asset 150, equipment specifications associated with the equipment asset 150, historical status data associated with similar types of equipment as the equipment asset 150, vendor information, user input (e.g., based on engineers/technicians knowledge and experience), other information, or a combination thereof. In some implementations, the monitoring device 102 may generate labelled training data for use in training the ML models 134. For example, the third training data may include labelled historical status data associated with the equipment asset 150, labelled historical status data associated other equipment assets that are similar to the equipment asset 150, or a combination thereof. The labels of this labelled historical status data may indicate observed or identified maintenance actions performed to prevent or alleviate faults corresponding to the respective labelled historical status data. For example, training data based on a particular status may be labelled with an indication of one or more maintenance actions performed to prevent a fault associated with the particular status. In some implementations, the monitoring device 102 may receive historical status data from the data source 154 for use in generating the third training data. In some implementations, training the ML models 134 may include tuning one or more hyper-parameters of one or more ML models, ensembling multiple ML models, other techniques, or a combination thereof, and selecting one or more highest performing ML models for inclusion in the ML models 134 based on results of clustering events in test data, as further described with reference to FIG. 3.

The equipment asset 150 includes any type of equipment that may be used during performance of an entity's day-to-day operations and that can be monitored, such as by sensors, to measure operating characteristics or other operational data. In some implementations, the equipment asset 150 includes or corresponds to industrial machinery, such as an oil rig, a well, a drill, a blaster, a conveyer, a ventilator fan, a mixer, a crane, a generator, a compressor, a lift, a pump, a refrigerator, a packager, a production line, a furnace, a distiller, or the like. Although primarily described herein as industrial machinery or in a refining, mining, or manufacturing context, the equipment asset 150 is not so limited. In other implementations, the equipment asset 150 may include or correspond to equipment or devices used in other industries or businesses, such as telecommunication equipment (e.g., routers, gateways, base stations, servers, network nodes, and the like), information services equipment (e.g., servers, databases, storage devices, and the like), power equipment (e.g., generators, transformers, power lines, regulators, and the like), vehicles (e.g., cars, trucks, military vehicles, watercraft, aircraft, spacecraft, drones, farming vehicles, trains, and the like), or another type of equipment that is monitored for performance in real-time. The equipment asset 150 may be associated with a large investment of capital by the entity or may be integral to the day-to-day operations of the entity, such that downtime of the equipment asset 150 may cause significant disruptions to operations of the entity and significant revenue losses to the entity.

The sensors 152 may include electronic sensors, mechanical sensors, wireless sensor devices (e.g., Internet of Things (IoT) sensors), or any type of sensing or monitoring component configured to measure or monitor at least one operating characteristic of the equipment asset 150. For example, the sensors 152 may include temperature sensors, pressure sensors, location sensors, speed sensors, volume sensors, leakage sensors, vibration sensors, audio sensors, cameras or other imaging devices, light sensors, particulate sensors, smoke sensors, carbon monoxide sensors, humidity sensors, frequency sensors, weight sensors, signal quality sensors, voltage sensors, current sensors, error rate sensors, counters, timers, and the like. Although shown in FIG. 1 as being external to the equipment asset 150, in some other implementations, the sensors 152 may be included or integrated in the equipment asset 150. The sensors 152 may be configured to generate the operating characteristics data 136 that indicates the measured or sensed operating characteristics associated with the equipment asset 150.

Data source 154 may include one or more storage locations or devices, such as servers, databases, and the like, configured to store data that is accessible via the network 170. In some implementations, the data source 154 may be configured to store historical operating data 156. The historical operating data 156 may include historical operating characteristics data associated with the equipment asset 150 (e.g., generated by the sensors 152), historical operating characteristics data associated with other equipment assets of the same type as (or otherwise similar to or providing predictive value for) the equipment asset 150, equipment specifications, historical fault reports/work orders associated with the equipment asset 150 (or similar equipment assets), historical maintenance actions performed on the equipment asset 150 (or similar equipment assets), historical analysis of value associated with performance of the work orders or maintenance actions, and the like. The data source 154 may be operated by the entity that owns or operates the equipment asset 150, a vendor of the equipment asset 150, a third-party data service, or a combination thereof.

The knowledge database 158 may include one or more databases (or other networked storage devices) configured to store data that is accessible via the network 170. In some implementations, the knowledge database 158 may be configured to store equipment asset analysis data 160 associated with the equipment asset 150. The equipment asset analysis data 160 may include at least a portion of the historical operating data 156, events identified based on the historical operating data 156, quantities of the events, times of the events, inferences determined based on the events, such as statuses (e.g., fault precursor states) of the equipment asset 150, maintenance actions performed on the equipment asset 150 based on the statuses, changes to operating characteristics based on performance of the maintenance actions, rankings of historical events, rankings of historical maintenance actions, and the like. Additionally or alternatively, the equipment asset analysis data 160 may include or correspond to event-insight-action data that indicates relationships between events, statuses (e.g., insights), and maintenance actions. The equipment asset analysis data 160 may represent the knowledge and insight of engineers (or other technicians), automatically determined data from the monitoring device 102, or a combination thereof. For example, the equipment asset analysis data 160 may indicate relationships between statuses and events, or between statuses and maintenance actions, that are manually determined by an engineer that analyzes detected events and determines the events that correspond to equipment statuses, such as operating states, issues or conditions experienced by the equipment asset 150, root causes of the operating states, issues, or conditions, impact of the issues or conditions, and the like, using their experience, knowledge, and training. The equipment asset analysis data 160 may also indicate ranking or prioritization of the detected events or the maintenance actions by the engineer. For example, if the engineer has observed that only 20% of the detected actions have predictive value (e.g., indicate observed statuses that offer the potential of improved performance by maintenance actions), the equipment asset analysis data 160 may indicate that these 20% of the detected events are ranked as priority events, and the remaining detected events are ranked as low-priority events. Similarly, if the engineer observes that only 20% of the maintenance actions that have been performed account for 80% of the improvement in performance, longevity, value, etc., of the equipment asset 150, the equipment asset analysis data 160 may indicate that these 20% of the maintenance actions are ranked as priority (e.g., worthy) maintenance actions, and the remaining maintenance actions may be categorized as low-priority maintenance actions. As another example, the equipment asset analysis data 160 may indicate events, statuses, and/or maintenance actions determined by the monitoring device 102 (e.g., using AI and ML techniques) or other devices of the system 100. The knowledge database 158 may be updated with new data based on determination of events, statuses, and/or maintenance actions by the monitoring device 102, results of performance of the maintenance actions, additional operating characteristics data from the sensors 152, other information, or a combination thereof, to continually refine the equipment asset analysis data 160 for use in training the ML models 126, the ML models 130, the ML models 134, or a combination thereof, as new inferences are determined and new maintenance actions are performed.

The user device 162 may include or correspond to a computer device used by a user, such as an engineer or other technician, to interact with the monitoring device 102 and enable performance of one or more of the operations described herein. For example, the user device 162 may include or correspond to a computing device, such as a desktop computer or a laptop computer, a mobile device (e.g., a smart phone, a tablet computer, a wearable device, a personal digital assistant (PDA), or the like), an audio/visual device, an entertainment device, a control device, a vehicle (or a component thereof), a VR device, an AR device, an XR device, or the like. To illustrate, the monitoring device 102 may include or correspond to a server that performs many of the processing intensive operations described herein, and the user device 162 may perform operations such as displaying GUIs, receiving user input, and the like. Although a single user device 162 is illustrated in FIG. 1, in other implementations, the system 100 may include multiple user devices 162. Alternatively, the functionality of the user device 162 may be performed by the monitoring device 102. For example, the monitoring device 102 may include or be coupled to the display device 140 and one or more user input devices to enable performance of the functionality of the user device 162.

During operation of the system 100, the monitoring device 102 may receive the operating characteristics data 136 from the sensors 152. The monitoring device 102 may detect or identify one or more events 110 based on the operating characteristics data 136 or receive events data indicating the events 110. To illustrate, the monitoring device 102 may extract features from the operating characteristics data 136 and may detect the events 110 based on the extracted features, such as by aggregating the extracted features, comparing the extracted features to various thresholds, or otherwise identifying relationships between the extracted features and events associated with the equipment asset 150. In some implementations, the monitoring device 102 may extract numerical features from the operating characteristics data 136. For example, the numerical features may include temperatures, pressures, voltages, currents, speeds, error rates, or the like. The monitoring device 102 may scale or otherwise transform the extracted numerical features, such as by performing a normalization transformation, a standardization transformation, a power transformation, a quantile transformation, or a combination thereof, on the extracted numerical features. Additionally, the monitoring device 102 may extract numerical features from non-numerical features in the operating characteristics data 136. As an example, the monitoring device 102 may convert categorical features or binary features to integer values, such as '1' and '0' for 'yes' and 'no,' respectively, or creating integer values using a one-hot encoding. As another example, the monitoring device 102 may perform natural language processing (NLP) on text data of the operating characteristics data 136 to convert the text data into numerical features. The NLP may include tokenization, removing stop words, stemming, lemmatization, bag of words processing, term frequency-inverse document frequency (TF-IDF) analysis, other NLP, or a combination thereof, as further described herein with reference to FIG. 2. Additionally or alternatively, the monitoring device 102 (or other devices of the system 100) may execute one or more event detection applications, and the monitoring device 102 may receive event data that indicates the events 110 from the event detection applications.

In some implementations, the monitoring device 102 may perform pre-processing on the operating characteristics data 136 and the events 110 prior to extracting features from the operating characteristics data 136 and the events 110. Performing the pre-processing may reduce complexity of the feature extraction, reduce the memory footprint associated with the operating characteristics data 136 and the events 110, clean up the operating characteristics data 136 and the events 110, format the operating characteristics data 136 and the events 110, or a combination thereof. For example, the pre-processing may include performing statistical analysis on the operating characteristics data 136 to remove or modify an outlier from the operating characteristics data 136, removing an entry from the operating characteristics data 136 that is associated with a variance that fails to satisfy a variance threshold, formatting the operating characteristics data 136, approximating a missing entry of the operating characteristics data 136, other pre-processing operations, or a combination thereof, as further described herein with reference to FIG. 2. Additionally or alternatively, the monitoring device 102 may perform dimensionality reduction on the extracted features from the operating characteristics data 136 and the events 110 to reduce a memory footprint associated with the extracted features and to reduce processing complexity of the clustering performed by the categorization engine 124. The dimensionality reduction may project the extracting features onto a lower-dimension feature space, such as by primary component analysis, singular value decomposition, or the like.

After extracting the features from the operating characteristics data 136 and the events 110, and optionally performing the dimensionality reduction, the monitoring device 102 may detect events 110 based on the extracted features or event data received from the event detection applications. For example, the monitoring device 102 may compare the extracted features (e.g., the extracted numerical features, the numerical features converted from the extracted non-numerical features, or a combination thereof) to one or more thresholds to detect the events 110. As a non-limiting example, the monitoring device 102 may detect (or receive indication of detection of) a drill temperature event based on a determination that a temperature of a drill included in the equipment asset 150 exceeds a temperature threshold. After detecting the events 110 (or receiving the event data), the monitoring device 102 may generate first input data based on the events 110 and the operating characteristics data 136 and provide the first input data to the categorization engine 124. For example, indications of one or more events during a particular time period may be vectorized, or otherwise processed, to generate the first input data that is provided to the categorization engine 124.

The categorization engine 124 may provide the first input data to the ML models 126 to identify priority events 112 from the entirety of the events 110. To illustrate, the ML models 126 may group the events indicated by the first input data into clusters of events associated with different categories (e.g., priorities). The events associated with a priority category (e.g., a high-priority or meaningful events) may be output by the categorization engine 124 as the priority events 112. For example, the ML models 126 may perform k-means clustering, or another type of clustering, to group the events 110 into the various categories, and the events associated with a particular cluster (e.g., the priority category) may be identified as the priority events 112. Because the ML models 126 may be trained using a large volume of training data, the categorization engine 124 may identify priority events that would not be identified by a human engineer, even after years of experience. Additionally or alternatively, the categorization engine 124 may compare the events 110 to a predetermined list of priority events, such as a list received from the knowledge database 158, to identify the priority events 112 from the events 110.

After identification of the priority events 112, the monitoring device 102 may generate second input data based on the priority events 112 and provide the second input data to the inference engine 128. For example, indications of the priority events 112, and optionally at least a portion of the operating characteristics data 136, may be vectorized, or otherwise processed, to generate the second input data that is provided to the inference engine 128. The inference engine 128 may provide the second input data to the ML models 130 to classify the priority events 112 indicated by the second input data into the status 114 (or multiple statuses). For example, the ML models 130 may determine the status 114 of the equipment asset 150 (e.g., an insight) based on the particular combination of the priority events 112. The status 114 may be one of a plurality of predefined statuses observed or expected at the equipment asset 150, some or all of which may be precursors to fault(s) at the equipment asset 150, root causes of a fault, and the like. The status 114 may be output by the inference engine 128. In some implementations, the monitoring device 102 may initiate display of the status 114, and optionally the priority events 112, a representation of at least a portion of the operating characteristics data 136, or a combination thereof, to a user, such as via the display device 140. In some such implementations, the monitoring device 102 may receive a user input responsive to the display of the status 114. The user input may indicate whether a user affirms the status 114 (e.g., as the likely status of the equipment asset 150 based on detection of the priority events 112). If the user input indicates affirmation of the status 114, processing may continue. However, if the user input indicates rejection of the status 114, the inference engine 128 may determine additional statuses based on the second input data until one of the statuses is affirmed by the user. Additionally or alternatively, the user input may indicate a modification to the status 114, and the monitoring device 102 may modify the status 114 based on the user input, such as to select a different status, to adjust a parameter value associated with the status, to modify a relationship between the status 114 and the priority events 112, or the like.

After determination (and optionally, user affirmation) of the status 114, the monitoring device 102 may generate third input data based on the status 114 and provide the third input data to the recommendation engine 132. For example, indications of the status 114, and optionally at least a portion of the operating characteristics data 136, may be vectorized, or otherwise processed, to generate the third input data that is provided to the recommendation engine 132. The recommendation engine 132 may provide the third input data to the ML models 134 to determine the maintenance actions 116 that are associated with the status 114 indicated by the third input data. For example, the ML models 134 may determine (e.g., select, identify, or recommend) the maintenance actions 116 that are associated with performance at the equipment asset 150 to prevent (or reduce the severity of) a fault that the status 114 is a precursor to. The maintenance actions 116 may include a single maintenance action or multiple maintenance actions, and the maintenance actions 116 may include actions to be performed by an engineer or other technician, actions to be automatically performed by the monitoring device 102 or a controller of the equipment asset 150, or a combination thereof. As non-limiting examples, the maintenance actions 116 may include inspection of the equipment asset 150, maintenance or repair to the equipment asset 150, replacement of the equipment asset 150, revisiting an operating envelope associated with equipment asset 150, inspecting, repairing, or replacing peripheral systems of the equipment asset 150, or the like. The recommendation engine 132 may output indications of the maintenance actions 116.

In some implementations, the clustering of the events 110 performed by the categorization engine 124, the classification/determination of the status 114 performed by the inference engine 128, and the determination(s) of the maintenance actions 116 performed by the recommendation engine 132, or a combination thereof, may be performed in real-time/substantially real-time (e.g., accounting for processing needs of the various aspects being utilized). In some other alternatives, at least some of the clustering (e.g., clustering of events based on historical event data or historical operation characteristics data) may be performed at an earlier time, and determination of the status 114 and the maintenance actions 116 may be performed rapidly based on the priority events 112 and at least a portion of the operating characteristics data 136.

After determination of the maintenance actions 116, the monitoring device 102 may generate an output 138 that indicates at least the maintenance actions 116. The output 138 may enable display of one or more of the maintenance actions 116, enable automated performance of one or more of the maintenance actions 116, or a combination thereof. To illustrate, the monitoring device 102 may provide the output 138 to the display device 140, or to the user device 162, to initiate display of a graphical user interface (GUI) that indicates one or more of the maintenance actions 116. For example, the GUI may include text, graphics, multimedia content, or the like, that indicates any of the maintenance actions 116 that are to be performed by a user (e.g., an engineer or technician) or an entirety of the maintenance actions 116, optionally including text that indicates whether each of the maintenance actions 116 is to be performed by the user or automatically. Maintenance actions that may be performed by the user include replacing a valve with a valve having a different size, adding a diffuser downstream of a valve, tightening a connection between two pipes, adding insulation to a component, manually clearing a feed, and the like, as non-limiting examples. In some implementations, the GUI may also indicate the status 114, the priority events 112, at least a portion of the operating characteristics data 136 (e.g., a portion that is associated with the priority events 112), additional information, or a combination thereof. Additionally or alternatively, the monitoring device 102 may use the output 138 to initiate performance of one or more of the maintenance actions 116. For example, the output 138 may include or correspond to one or more instructions to perform one or more of the maintenance actions 116, and the monitoring device 102 may transmit the output 138 to a control device for the equipment asset 150, or to the equipment asset 150 if the equipment asset 150 is capable of performing maintenance actions. Maintenance actions that may be automatically performed by the monitoring device 102 or a control device of the equipment asset 150 include reducing an operating level of the equipment asset 150, reducing power to one or more components of the equipment asset 150, initiating an order for replacement parts, initiating additional testing to further identify a cause of an event, bypassing a poorly functioning component of the equipment asset 150, change an encoding scheme used for data transmissions, initiate a warning (e.g., an alert message, a visual warning, an audio warning, or the like), initiate a shutdown of the equipment asset 150, and the like, as non-limiting examples. In some implementations, these maintenance actions may be displayed to the user for acceptance by the user, and the maintenance actions may be initiated or performed by the monitoring device 102 based on user input indicating that the maintenance actions are accepted.

In some implementations, the monitoring device 102 may generate the additional training data 120 based on results of performance of the maintenance actions 116. For example, the monitoring device 102 may receive additional operating characteristics data after performance of the maintenance actions 116, and the additional training data 120 may be generated based on the results of performance of the maintenance actions 116 that are indicated by the additional operating characteristics data. The monitoring device 102 may further train the ML models 126, the ML models 130, the ML models 134, or a combination thereof, based on the additional training data 120. For example, the additional training data 120 may indicate an impact of performance of the maintenance actions 116 associated with the priority events 112, and the monitoring device 102 may further train the ML models 126 based on the additional training data 120 to refine the clustering of events performed by the ML models 126. As another example, the additional training data 120 may indicate whether a user affirmed or rejected the status 114, and the monitoring device 102 may further train the ML models 130 based on the additional training data 120 to refine the classification of events into statuses (e.g., insights). As another example, the additional training data 120 may indicate the impact of performance of the maintenance actions 116, and the monitoring device 102 may further train the ML models 134 based on the additional training data 120 to refine the determination of maintenance actions associated with the status 114. By training the ML models 126, 130, and 134 based on the results of performance of the maintenance actions 116, the monitoring device 102 may enable the ML models 126, 130, and 134 to dynamically adapt to changes in the equipment asset 150 and to new information and relationships that are identified by the ML models 126, 130, and 134, which improves the utility of the ML models 126, 130, and 134 compared to other monitoring systems based on static information. Additionally or alternatively, the results of performance of the maintenance actions 116, the affirmation of the status 114, the detection of the priority events 112, or a combination thereof, may be provided to the knowledge database 158 for maintaining and updating the equipment asset analysis data 160, which may be used in training of the ML models 126, 130, and 134, or ML models for monitoring other equipment assets, as well as providing information to the entity for use in making repair and purchasing decisions related to the equipment asset 150.

As described above, the system 100 provides an automated system for monitoring operating characteristics and other real-time data provided by the equipment asset 150 and the sensors 152 to identify the priority events 112, determine the status 114 associated with the priority events 112, and determine the maintenance actions 116 to be performed at the equipment asset 150 to prevent (or reduce a severity of) a fault at the equipment asset 150. By using the trained ML models 126 to cluster events into various priorities (or other categories), the system 100 enables automated identification of high-priority (e.g., meaningful) events from a large amount of detected events in real-time, which would be difficult or impossible for engineers or other technicians due to the quantity of events that are detected. Additionally, by using the trained ML models 130 and the trained ML models 134, the system 100 automatically identifies the status 114 with minimal user input and recommends the maintenance actions 116 that, when performed at the equipment asset 150, are likely to prevent (or reduce the severity of) a fault that is associated with the status 114, or provide other benefits to the equipment asset 150. In this manner, the system 100 provides efficient and real-time recommendations of preventative maintenance actions (or other actions) that can reduce or eliminate downtime of the equipment asset 150, which may enable on-time and on-budget completion of a project by an entity that owns or operates the equipment asset 150, as well as prolonging the operational lifetime of the equipment asset 150. Preventing delays or disruptions due to downtime of the equipment asset 150 may also prevent significant revenue loss and degradation of the business reputation of the entity. Additionally, because the system 100 enables continual training of the ML models 126, 130, and 134, the system 100 may dynamically adapt to new information or to changes in the equipment asset 150, which improves the utility of the system 100 during the operational lifetime of the equipment asset 150.

Figure 2:
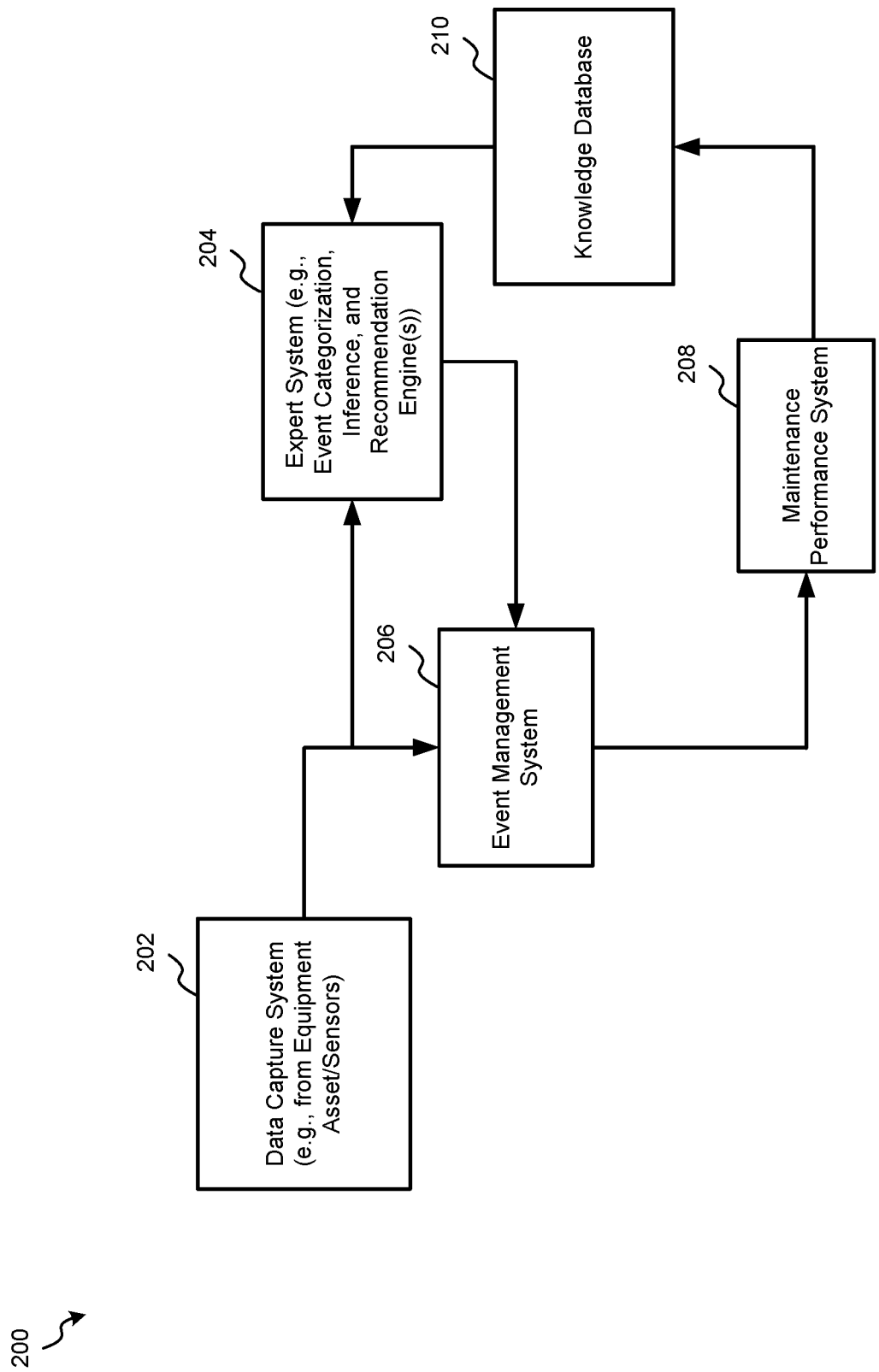
FIG. 2 is a block diagram of another example of a system for event categorization and equipment status and maintenance action recommendation using machine learning according to one or more aspects.

Referring to FIG. 2, another example of a system for event categorization and equipment status (e.g., insight) and maintenance action recommendation using machine learning according to one or more aspects is shown as a system 200. In some implementations, the system 200 may include or correspond to the system 100 of FIG. 1. As shown in FIG. 2, the system 200 includes a data capture system 202, an expert system 204, an event management system 206, a maintenance performance system 208, and a knowledge database 210.

The data capture system 202 may be configured to capture data, such as operational characteristics data, associated with operation of an equipment asset or multiple equipment assets. The data capture system 202 may include one or more components of the equipment asset (e.g., if the equipment asset is configured to generate operational characteristics data), one or more sensors configured to monitor the equipment asset, other monitoring devices (e.g., global positioning system (GPS) receivers, timers, and the like), or a combination thereof. In some implementations, the data capture system 202 includes or corresponds to the sensors 152 of FIG. 1. The data capture system 202 may be configured to capture information associated with the equipment asset from various sources, such as equipment health monitoring (EHM) information, risk register information, predictive model information, and the like, in addition to the operating characteristics data. In some implementations, the data capture system 202 may support one or more application programming interfaces (APIs) configured to extract, transform, and store the various data for use by other components of the system 200. The data capture system 202 may provide the captured data (e.g., the operating characteristics data) to the expert system 204 and to the event management system 206.

The expert system 204 may be configured to detect and categorize events based on the data received from the data capture system 202 (e.g., the operating characteristics data), to determine a status of the equipment asset (also referred to as "an insight") based on at least some of the detected events, and to determine one or more maintenance actions to be performed with respect to the equipment asset based on the determined status. In some implementations, the expert system 204 may include or correspond to the categorization engine 124, the inference engine 128, the recommendation engine 132, or a combination thereof, of FIG. 1. The expert system 204 may leverage one or more ML models to enable training of the expert system 204 to detect and categorize events, to determine statuses, to determine maintenance actions, or a combination thereof. For example, the expert system 204 may access a first set of one or more ML models configured to cluster detected events into categories based on priorities (e.g., predictive values with respect to an impending fault at the equipment asset) of the events, a second set of one or more ML models configured to determine a status of the equipment asset (e.g., a precursor state to a fault) based on one or more priority events, and a third set of one or more ML models configured to determine one or more maintenance actions to be performed with respect to the equipment asset based on the determined status. These ML models may be configured to operate as an "Event to Insight to Action Workflow" facilitates event creation and analysis, creation of insights, recommendations of maintenance actions, and feedback based on performance of the maintenance actions. In some implementations, the expert system 204 includes or has access to the ML models 126, the ML models 130, the ML models 134, or a combination thereof, of FIG. 1. The expert system 204 may be configured to train these models using training data that indicates features that are extracted from historical operating characteristics data, equipment specifications, vendor information, historical operating characteristics data associated with similar equipment assets, information from the knowledge database 210, other information, or a combination thereof, as further described herein with reference to FIG. 3.

The expert system 204 may be configured to detect the events based on values of particular parameters of the operating characteristics data (e.g., the data received from the data capture system 202). To illustrate, the expert system 204 may compare particular parameter values extracted from the operating characteristics data to various thresholds and, based on the comparisons, detect occurrence of one or more events. As a particular, non-limiting example, the expert system 204 may detect a valve overheating event based on a value of a valve temperature included in the operating characteristics data exceeding a temperature threshold. In some implementations, detecting the events may include preprocessing the operating characteristics data, such as performing NLP on text data of the operating characteristics data to convert the text data to numerical features or transforming categorical values of the operating characteristics data to numerical features.

Additionally, the expert system 204 may be configured to categorize the detected events. To illustrate, the expert system 204 may be configured to group the detected events into clusters based on the priority and/or predictive value of the events (e.g., the impact of performance of maintenance actions associated with the events on preventing a fault or mitigating issues at the equipment asset). For example, the expert system 204 may assign a voltage spike event to the priority events cluster based on the voltage spike event being associated with a maintenance action that resulted in a 90% reduction in downtime of the equipment asset as compared to not addressing the voltage spike event, as a non-limiting example. As another example, the expert system 204 may assign a rising temperature event to a routine or non-priority cluster based on the rising temperature event being associated with a maintenance action that failed to cause a discernable impact on the occurrence of a fault caused by overheating of the equipment asset. As new events are detected by the expert system 204, the new events may be assigned to clusters using the first ML models to categorize the new events as priority events, routine events, or the like, even though the new events may include events that have not been previously observed. In this manner, the expert system 204 may predict a priority of a newly detected event based on underlying similarities between the newly detected event and previously clustered events.

The expert system 204 may be configured to determine a status of the equipment asset (e.g., an insight) based on the priority events, and optionally at least a portion of the operating characteristics data. For example, the expert system 204 may be configured to perform a classification task on the priority events using ML models that have been trained for event-to-status classification, such as based on training data generated from information from the knowledge database 210. The determined status may be a status (e.g., an operating state) that is precursor to a fault or other issues with the equipment asset and, as such, may be a desirable candidate for performing preventative maintenance actions. As an example, the expert system 204 may determine a status of the equipment asset based on underlying similarities between currently detected priority events and priority events associated with various predefined statuses (e.g., fault precursor states). In some implementations, in addition to determining the status of the equipment asset, the expert system 204 may also identify one or more relevant (e.g., "vital") parameters from the operating characteristics data that are associated with the determined status or are useful in selecting one or more maintenance actions to prevent a fault associated with the status.

The expert system 204 may be configured to determine one or more maintenance actions to be performed with respect to the equipment asset based on the status, and optionally at least a portion of the operating characteristics data. For example, the expert system 204 may be configured to perform a classification task on the status using ML models that have been trained for status/insight-to-maintenance action classification, such as based on training data generated from information from the knowledge database 210. The expert system 204 may determine the maintenance actions based on historical data indicating that particular maintenance actions were performed after identification of a particular status, the maintenance actions including actions recommended by an engineer or technician and actions previously determined actions by the expert system 204, other information, or a combination thereof. In some implementations, the expert system 204 may determine maintenance actions that are associated with an impact on operation of the equipment asset that satisfies a threshold, which may be referred to as "worthy actions." In this manner, the expert system may be configured to identify patterns in incoming operating characteristics data and in real-time/near real-time predict the occurrence of similar events and recommend the best possible maintenance actions to prevent faults or mitigate issues associated with the detected/predicted events.

The event management system 206 may be configured to enable a user to manage detected events associated with the equipment asset. The event management system 206 may include a monitoring device, such as a control panel, a server, a user device, another type of computing device, or a combination thereof. In some implementations, the event management system 206 may include or correspond to the monitoring device 102 of FIG. 1. Although described as a separate component than the expert system 204, in some other implementations, the event management system 206 may include the expert system 204. The event management system 206 may be configured to provide the user with information derived from the operating characteristics data generated by the data capture system 202. For example, the event management system 206 may display the events detected by the expert system 204, the priority events identified by the expert system 204, the status determined by the expert system 204, the maintenance actions determined by the expert system 204, or a combination thereof, and optionally any portion of the operating characteristics data relevant to or associated with the events, the status, or the maintenance actions. In some implementations, the event management system 206 may enable user interaction in the Event to Insight to Action Workflow. For example, the event management system 206 may display a status (e.g., an insight) determined by the expert system 204 based on priority events corresponding to the received operational characteristics data. The user may be prompted to affirm or reject the determined status. If the user affirms the status, the event management system 206 may request maintenance actions from the expert system 204 and display the maintenance actions. Alternatively, if the user rejects the status, the event management system 206 may request determination of additional status(es) by the expert system 204 or the user may indicate a modification to the status to be performed by the expert system 204. In some implementations, the event management system 206 may display maintenance actions to be performed at the equipment asset to enable performance of preventative maintenance.

The maintenance performance system 208 may be configured to enable a user to perform one or more of the maintenance actions at the equipment asset, to automatically perform (or initiate performance of) one or more of the maintenance actions at the equipment asset, or a combination thereof. The maintenance performance system 208 may include a user device, a server, a control device of the equipment asset, another type of electronic device, or a combination thereof. In some implementations, the maintenance performance system 208 may include or correspond to the monitoring device 102 or the user device 162 of FIG. 1. In some implementations, the maintenance performance system 208 may include a user device of an engineer or other technician, and the user device may display one or more of the maintenance actions that are to be performed by a user, such as manual replacement of a particular part at the equipment asset, manual adjustment of a physical property of the equipment asset, manual inspection of a component of the equipment asset, or the like. In some implementations, the maintenance performance system 208 may receive and store user input that indicates information associated with performance of the maintenance actions, such as dates and times of performance of the maintenance actions, observed conditions of the equipment asset after performance of the maintenance actions, optimizations or additional actions performed by the user, and the like. Additionally or alternatively, the maintenance performance system 208 may automatically initiate performance of one or more of the maintenance actions. For example, the maintenance performance system 208 may transmit one or more instructions that indicate the maintenance actions to control device(s) of the equipment asset to cause the control device(s) to perform the maintenance actions. As a particular, non-limiting example, the maintenance performance system 208 may transmit an instruction to move a location of a crane, to lower a drill, to increase the speed of a conveyor belt, or the like, to control device(s) configured to control aspects of the equipment asset. As another example, the maintenance performance system 208 may automatically perform one or more of the maintenance actions, such as emitting an audible alert, ordering a replacement part for the equipment asset, performing diagnostics on particular parameters of the operating characteristics data, or the like.

The knowledge database 210 may be configured to store equipment analysis data associated with the equipment asset. The knowledge database 210 may include or correspond to one or more databases, one or more servers, one or more storage devices, other data sources or storage locations, or a combination thereof. In some implementations, the knowledge database 210 may include or correspond to the knowledge database 158 of FIG. 1. The knowledge database 210 may store historical data (e.g., operating characteristics data, event data, status/insight data, maintenance action data, or a combination thereof) associated with the equipment asset, events, priority events, status, and maintenance actions determined by the expert system 204, input data received by the event management system 206, feedback from the maintenance performance system 208, or a combination thereof. This information may be stored and used as training data to further train the ML models included in or accessible to the expert system 204. In this manner, the knowledge database 210 may be configured to maintain up-to-date equipment analysis data for the equipment asset that can be leveraged to further refine operations of the expert system 204, which enables the expert system 204 to dynamically adapt based on new information or changes in the equipment asset.

As described above, the system 200 leverages machine learning, via the expert system 204, to improve event categorization, equipment status (e.g., insight) determination, and maintenance performance compared to conventional event detection systems that do not analyze detected events to determine equipment statuses or recommend maintenance actions. For example, the expert system 204 may provide automated suggestion of insights (e.g., statuses) based on detected events and automated suggestion of maintenance actions based on accepted insights. Additionally or alternatively, the system 200 may enable identification of priority/worthy events from a pool of multiple events that are detected based on real-time operating characteristics data. Additionally, the system 200 may predict occurrence of similar events and suggest maintenance actions prior to actual detection of the similar events, which may increase the likelihood that a fault is prevented at an equipment asset.

Figure 3:
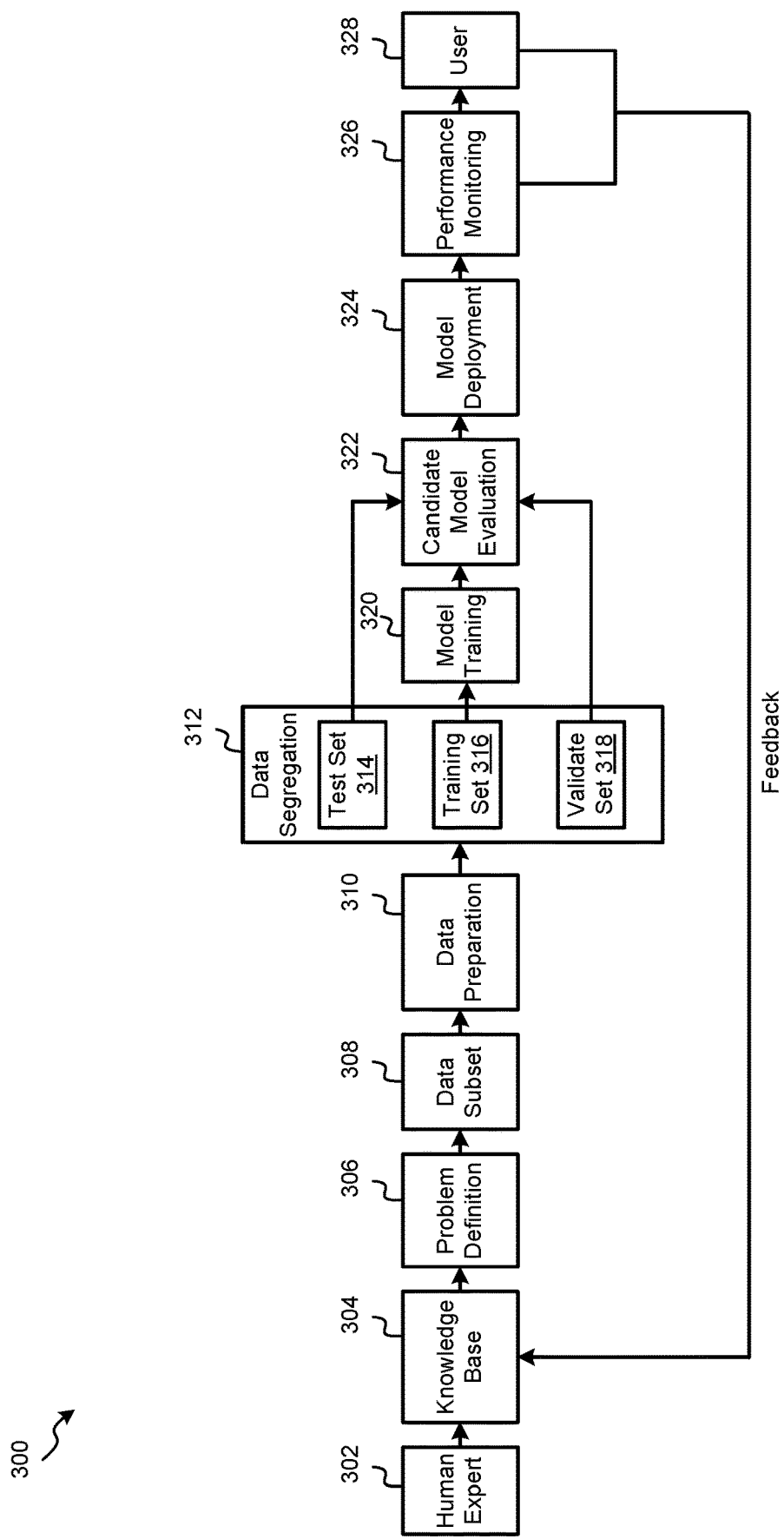
FIG. 3 is a flow diagram illustrating an example of a process for training and deploying machine learning models for use by the systems of FIGS. 1 and 2.

Referring to FIG. 3, a flow diagram of an example of a method for training and deploying machine learning models for use by the systems 100-200 of FIGS. 1 and 2 is shown as a method 300. The machine learning (ML) models may be used to categorize events that are detected based on operating characteristics data associated with an equipment asset, to determine status(es)/insights based on the detected events (e.g., priority events), and to determine maintenance actions (or other actions) to be performed at the equipment asset based on the status(es)/insights. In some implementations, the operations of the method 300 may be stored as instructions that, when executed by one or more processors (e.g., the one or more processors of a monitoring device or a server), cause the one or more processors to perform the operations of the method 300. In some implementations, the method 300 may be performed by a computing device, such as the monitoring device 102 of FIG. 1 (e.g., a computer device configured to train ML models for use in event categorization, insight determination, and/or maintenance action determination), the expert system 204 of FIG. 2, or a combination thereof.

The method 300 includes receiving user input from a human expert, at 302. The human expert may include one or more engineers, one or more maintenance technicians, one or more others with knowledge relating to the equipment asset, or a combination thereof. The user input may indicate relationships between particular operating characteristics and particular events, relationships between detected events and insights associated with the equipment asset during or after occurrence of the detected events (e.g., an operating state of the equipment asset, an issue or condition experienced by the equipment asset, a root cause of the condition, an impact of the condition, or the like), rankings of the detected events, particular faults that particular statuses are precursors to (or issues that are likely to increase in severity due to the particular statuses), relationships between statuses or faults and maintenance actions performed at the equipment asset to prevent or remedy the fault (or mitigate other issues), rankings of maintenance actions that have been performed (e.g., based on impact, such as preventing a fault or reducing a severity of an issue), other information, or a combination thereof. The user input may be based on knowledge accumulated by the human expert, such as based on experience monitoring equipment or performing maintenance, study of engineering or equipment maintenance, related industry experience, and the like. Additionally or alternatively, the method 300 may also include receiving information relating various types of data or ranking various elements based on performance of one or more automated analysis operations, such as statistical analysis operations, as a non-limiting example.

The method 300 includes maintaining a knowledge base, at 304. The knowledge base may include the user input from the human expert, information from equipment specifications associated with the equipment asset, vendor information, equipment specifications or information associated with similar equipment to the equipment asset, additional information, or a combination thereof. The knowledge base (e.g., the information) may be stored in one or more databases (e.g., one or more common databases) that are accessible to monitoring device(s) for the equipment asset and to one or more devices configured to train ML models for use in monitoring the equipment asset.

The method 300 includes determining a problem definition, at 306. The problem definition a particular problem to be addressed by the ML models, such as a particular goal of the maintenance actions that will eventually be recommended by the ML models. For example, the problem definition may include reducing or eliminating downtime of the equipment asset due to common faults, preventing failure of a particular component of the equipment asset, prolonging an operational lifetime of the equipment asset, mitigating a particular type of performance degradation of the equipment asset, and the like. The method 300 also includes extracting a subset of data from the knowledge base, at 308. The subset of data may be extracted based on the problem definition. For example, particular parameters of the data stored at the knowledge base may be extracted based on the relationship of the particular parameters to the problem definition. In some implementations, the subset of data may be extracted based on knowledge of the human expert, statistical analysis of the data stored at the knowledge base, information from other sources, or a combination thereof.

The method 300 includes data preparation, at 310. The data preparation may include performing one or more pre-processing operations on the subset of data in order to achieve a suitable dataset that can be consumed by the ML models. The data preparation may include data cleaning and formatting, feature selection, data transformation, feature engineering, dimensionality reduction, or a combination thereof. The data cleaning and formatting may include identifying and rectifying specific parameter values that may be incorrect, such as due to an error in a sensor/measuring device, incorrect entry of input data, and the like. These incorrect parameter values may be identified as outliers from related parameter values. As a particular example, a fluid temperature of 100000 C.° that is associated with an event of "Normal Operation" may be an incorrect parameter value. These incorrect values/outlier data may be identified using statistical methods and analysis, and the incorrect values/outliers may be addressed by deletion or correction. The data cleaning and formatting may also include addressing parameters having duplicate values or groups of the same values or values with no variance. Because these values may not provide any useful information for training the ML models, parameters that have such values (e.g., duplicates, groups of the same values, groups of values with no variance, etc.) may be deleted. Additionally or alternatively, the data cleaning and formatting may also include formatting or standardizing at least some of the subset set of data, such as ensuring that values of the same data type have the same formatting or otherwise standardizing values of the same parameter or data type. Additionally or alternatively, the data cleaning and formatting may also include identifying missing values in the subset of data, which may be deleted or imputed with values using various imputation techniques such as interpolation, extrapolation, mean imputation, substitution, regression imputation, stochastic regression imputation, and the like.

The feature selection may include extracting features from the subset of data that are highly influential in predicting the target variable (e.g., based on the problem definition), such that substantially irrelevant features are not included in the training data, which may improve performance of the ML models and reduce complexity of the ML models. To features that are selected may be based on statistical analysis of the subset of data and the target variable, for example using methods such as correlation. Some statistical analysis methods may differ for categorical features and numerical features, and some ML models may perform automatic feature selection. As such, feature selection may be important for providing the features that improve the efficiency of the ML models.

The data transformation may include converting variables in the selected features from one type (e.g., categorical or text) to another type (e.g., binary or numerical), standardizing or otherwise distributing the variables, or a combination thereof. To illustrate, the data transformation may include transforming categorical features, transforming numerical features, and transforming text features. For categorical features, if the categorical feature is a text feature or ordinal data, the categorical feature may be converted to a numerical feature or a binary-based feature, respectively, to enable correct interpretation of the features by the IL models. For example, if a feature includes text values 'yes' and 'no,' these text values may be converted to integers (e.g., '1' and '0,' respectively). As another example, if the feature includes n categories, the feature may be converted to (n−1) columns of numerical features using a one-hot encoding. For numerical features, the numerical features may be scaled between a particular range of values that improves the performance of the MIL models. The distribution of the numerical features may be transformed (e.g., modified) to achieve a target distribution, such as by removing skewness, changing a mean, and the like. As an example, a numerical transformation may be applied to scale the numerical feature to a range of 0 to 1 (or any other target range). As another example, a standardization transformation may be applied to scale the numerical feature to a standard Gaussian distribution. As another example, a power transformation may be applied to change the distribution of the numerical feature. As another example, a quantile transformation may be applied to impose a particular probability distribution on the numerical feature, such as a uniform probability distribution.

For text features, natural language processing (NLP) may be performed on the text features to convert the text features into numerical features. The NLP may include tokenization, removing stop words, stemming, lemmatization, bag of words modelling, term frequency-inverse document frequency (TF-IDF) modelling, other NLP techniques, or a combination thereof. For example, tokenization may be performed to convert a sentence to words, such as converting 'Leakage crossing the tolerance limit' to ['Leakage', 'crossing', 'the', 'tolerance', 'limit', '.']. As another example, "stop words" (e.g., common words in a language that do not carry important meaning, such as 'the', 'a', 'on', 'is', 'all', etc., in English) may be removed, resulting in ['Leakage', 'crossing', 'tolerance', 'limit']. As another example, stemming may be performed to reduce words to their word stems that affix to suffixes and prefixes, or to the root word, such as stemming the words 'leaking', 'leaks', and 'leakage' to the word stem 'leak'. As another example, lemmatization may be performed to reduce words to their word stems that affix to suffixes and prefixes or to the meaningful root word, such as lemmatizing the words 'leaking', 'leaks', and 'leakage' to the meaningful root word 'leak'. As another example, bag of words modelling may be performed to model the sentences (or a paragraph, a document, etc.) as a "bag" (e.g., a multiset) of its words, disregarding grammar and word order, but keeping multiplicity. To illustrate, each sentence may be modelled as a vector where the value of each element indicates the number of occurrences of a corresponding word in the sentence, as shown in Table 1 below for the following four input sentences: 'Excess leakage', 'Normal operation', 'Pressure exceeding the tolerance limit', and 'Temperature variation'.

TABLE 1

Bag of Words Modelling Examples

| Word/Sent | exceeding | normal | temperature | leakage | variation | limit | excess | pressure | operation | tolerance |
|---|---|---|---|---|---|---|---|---|---|---|
| Sent1 | 0 | 0 | 0 | 1 | 0 | 0 | 1 | 0 | 0 | 0 |
| Sent2 | 0 | 1 | 0 | 0 | 0 | 0 | 0 | 0 | 1 | 0 |
| Sent3 | 1 | 0 | 0 | 0 | 0 | 1 | 0 | 1 | 0 | 1 |
| Sent4 | 0 | 0 | 1 | 0 | 1 | 0 | 0 | 0 | 0 | 0 |

As another example, TF-IDF modelling may be performed to model the sentence based on numerical statistics that represent how important a word is to a document in a collection or corpus, as shown in Table 2 below for the above-described four input sentences.

TABLE 2

TF-IDF Modelling Examples

| Word/Sent | exceeding | excess | leakage | limit | normal | operation | pressure | temperature | tolerance |
|---|---|---|---|---|---|---|---|---|---|
| Sent1 | 0 | 0.707107 | 0.707107 | 0 | 0 | 0 | 0 | 0 | 0 |
| Sent2 | 0 | 0 | 0 | 0 | 0.707107 | 0.707107 | 0 | 0 | 0 |
| Sent3 | 0.447214 | 0 | 0 | 0.447214 | 0 | 0 | 0.447214 | 0 | 0.447214 |
| Sent4 | 0 | 0 | 0 | 0 | 0 | 0 | 0 | 0.707107 | 0 |

The feature engineering may include deriving new features from existing, already extracted features, which may add more direct context about the corresponding variable(s). Feature engineering is very specific to the available data. Additionally or alternatively, feature engineering may be based on business inputs. In some implementations, the feature engineering may include creating interaction features or polynomial features, deriving features from a date feature, such as day of the week or weekday/weekend, creating or deriving other additional features, or the like. The interaction features may include features generated by performing mathematical operations on two or more features, such as a sum, a difference, a product, or the like, and the polynomial features may be generated by combining two or more features that are raised to different powers. The dimensionality reduction may be optionally performed when there is a large quantity of features extracted from the subset of data. If there is a large quantity of features, there is a possibility that data is very sparse and that not all of the features are equally significant. Although additional feature selection could be performed, removing features causes loss of the information from the removed features. In order to capture the information from less significant features, the features may be projected onto a lower-dimension space that preserves the information of the features. Thus, the dimensionality reduction may include one or more techniques to project the features onto a lower-dimension space, such as primary component analysis (PCA), singular value decomposition, and the like.

The method 300 includes data segregation, at 312. The data segregation includes designating a portion of the data (e.g., the features generated during the data preparation) as a test set 314, a portion of the data as a training set 316, and a portion of the data as a validation set 318. The training set 316 may be used to train the ML models, the test set 314 may be used to evaluate the trained ML models, and the validation set 318 may be used to identify one or more of the best ML models by tuning hyper-parameters of the ML models to achieve the best results based on the validation set 318. After the one or more best ML models are selected, a portion of the test set 314 may be used to evaluate the performance of the selected ML model(s). The data segregation may include sequentially splitting the data, randomly splitting the data, shuffling records after the sequential or random splitting, or the like. In some implementations, the type of data segregation that is performed may be based on the problem definition (e.g., the type of problem to be solved, such as time-series forecasting, simple regression, etc.).

The method 300 includes model training, at 320. For example, one or more types of ML models may be selected based on the problem definition, such as decision trees, SVMs, DNNs, etc., and the ML models may be trained using the training set 316. Training the ML models configures the ML models to perform the type of operations associated with solving the defined problem, such as categorizing events, recommending the status of the equipment asset (e.g., inferring insights), recommending maintenance actions, etc. The method 300 includes candidate model evaluation, at 322. For example, at least a portion of the test set 314 may be provided to the candidate ML models (e.g., the trained ML models) to evaluate the performance of the candidate ML models. Based on the results, one or more of the best performing ML models (e.g., a subset of the candidate ML models) may be selected. The validation set 318 may be provided to the subset of candidate ML models to tune hyper-parameters of the subset of ML models to improve performance. For example, if the subset of candidate ML models include SVMs, the hyper-parameters may include kernel, gamma (e.g., a width of a Gaussian kernel), C (e.g., a soft margin constant), and the like. As another example, if the subset of candidate ML models includes NNs, the hyper-parameters may include numbers of layers, numbers of hidden layers, function constraints, and the like. In some implementations, grid searches or random searches may be performed in the given ranges of values for hyper-parameters to identify the tuned values of the hyper-parameters. Other variations of performance enhancement may be performed on the candidate ML models in addition to hyper-parameter tuning, such as ensembling of the ML models, to improve the performance. Such operations and testing may be performed iteratively to identify one or more candidate ML models for deployment.

The method 300 includes model deployment, at 324. For example, the selected ML models from the candidate ML models may be deployed, such as being integrated within a monitoring device or an expert system, for generating real-time predictions associated with the equipment asset. To illustrate, the deployed ML models may predict a priority of a detected event (e.g., based on clustering the event), determine/recommend a status of the equipment asset based on priority events, determine/recommend one or more maintenance actions to be performed at the equipment asset, generate other recommendations, or a combination thereof. The method 300 includes performance monitoring, at 326. For example, the results of performance of the maintenance actions, as shown by additional operating characteristics data associated with the equipment asset, may be monitored to determine performance of the deployed ML models. The method 300 also includes receiving user input, at 328. For example, a user may provide feedback regarding the performance of the ML models, such as whether a determined status/insight is affirmed or rejected, additional information related to performance of the maintenance actions, observations of performance of the equipment asset, etc. In some implementations, output of the performance monitoring, at 326, the user input received at 328, or a combination thereof, may be provided as feedback data for use in maintaining the knowledge base, at 304. For example, the knowledge base may be updated based on the feedback data, and the ML models may be further trained based on the feedback data. In some implementations, the feedback data may be provided, and the ML models further trained, when negative feedback is received, when any feedback is received, when a particular quantity of feedback is received, or based on a user request. Additionally or alternatively, the feedback data may be provided, and the ML models further trained, according to a particular schedule.

As described above, the method 300 maintains a knowledge base, trains ML models, and deploys ML models for generating recommendations associated with monitoring the equipment asset. The training of the ML models based on data from the knowledge base enables the ML models to generate recommendations to solve particular maintenance related problems, such as recommending maintenance actions to prevent faults or to prolong the operational lifetime of the equipment asset. For example, the knowledge base may maintain information derived from engineers' or other human experts' experience and knowledge, in addition or in the alternative to information derived from automated statistical analysis, that indicates relationships between detected events and equipment status (e.g., insights), relationships between equipment status and maintenance actions, ranking of detected events (e.g., based on impact related to occurrence of a corresponding equipment status), ranking of maintenance actions (e.g., based on impact of the maintenance actions to achieving a particular goal, such as preventing a fault), and the like. Additionally or alternatively, performing pre-processing operations on the selected data, such as data cleaning, feature selection, and the like, may improve the efficiency and reduce the complexity of the ML models. Additional performance enhancements may be provided by tuning hyper-parameters of candidate ML models using validation data to enables selection of the best performing candidate ML models for deployment.

Figure 4:
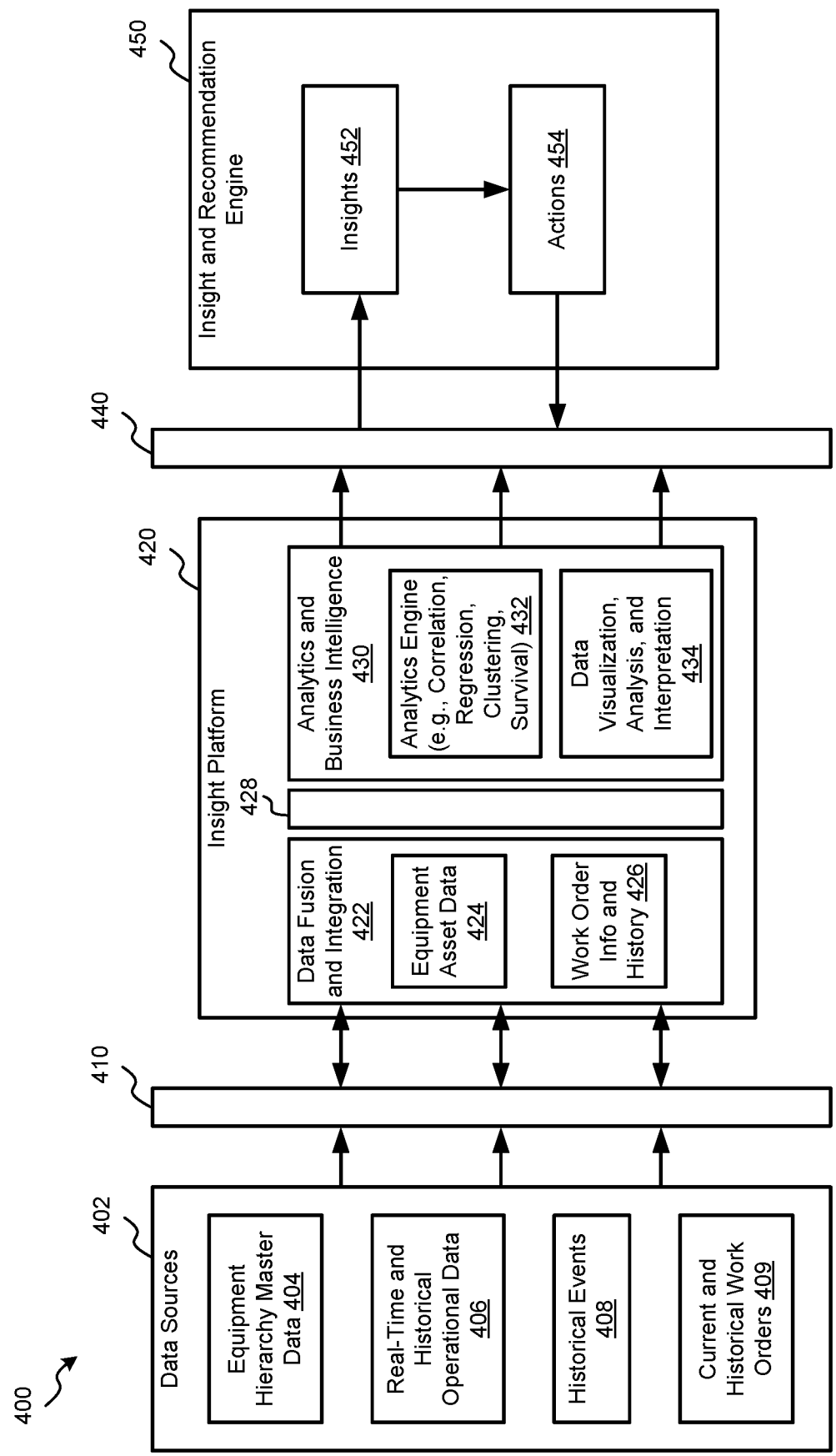
FIG. 4 is a block diagram of another example of a system for event categorization and equipment status and maintenance action recommendation using machine learning according to one or more aspects.

Referring to FIG. 4, another example of a system for event categorization and equipment status and maintenance action recommendation using machine learning is shown as a system 400. In some implementations, the system 400 may include or correspond to the system 100 of FIG. 1 or the system 200 of FIG. 2. As shown in FIG. 4, the system 400 includes data sources 402, an API/data ingestion layer 410, an insight platform 420, a collective intelligence application 440, and an insight and recommendation engine 450. In some implementations, the insight platform 420, the collective intelligence application 440, and the insight and recommendation engine 450 may be implemented as a service on a data analytics platform (e.g., using AI and ML).

The data sources 402 may include one or more sources of data for use in training ML models and analyzing by the insight platform 420 to perform the event categorization, management, and maintenance action determination. The data sources 402 may include data from one or more other devices or locations that is associated with an equipment asset, such as the equipment asset 150 of FIG. 1. For example, the data sources 402 may include equipment hierarchy master data 404, real-time and historical operational data 406, historical events 408, and current and historical work orders 409. The equipment hierarchy master data 404 may include data indicating the structure of an asset hierarchy that includes the equipment asset, or information associated with particular equipment assets, such as equipment specifications, vendor equipment, etc. The real-time and historical operational data 406 may include operational data captured by one or sensors that are configured to monitor the equipment asset, such as the sensors 152 of FIG. 1. The historical events 408 may include one or more events previously detected by the insight platform 420 that correspond to the equipment asset. The historical work orders 409 may indicate one or more maintenance actions previously performed at the equipment asset. The API/data ingestion layer 410 may support one or more APIs that are configured to extract relevant data from the data sources 402, such as data associated with the particular equipment asset, particular types of data (e.g., based on a problem definition), and the like.

The insight platform 420 may be configured to support data analysis, interpretation, and visualization for event detection, insight (e.g., status) determination, and maintenance action recommendation. In some implementations, the insight platform 420 may include or correspond to the monitoring device 102 of FIG. 1 or the event management system 206 of FIG. 2. As shown in FIG. 4, the insight platform 420 may include a data fusion and integration module 422, a data preparation and transformation module 428, and an analytics and business intelligence module 430. The data fusion and integration module 422 may be configured to group or otherwise parse the data received from the API/data ingestion layer 410. For example, the data fusion and integration module 422 may group the received data into equipment asset data 424 and work order information and history 426. The equipment asset data 424 may include data indicative of expected operation of the equipment asset, such as equipment specification data, and operating condition data associated with the equipment asset. The work order information and history 426 may indicate maintenance actions performed at the equipment asset and the relationship between the maintenance actions and detected events. The data preparation and transformation module 428 may be configured to pre-process, transform, mash-up, filter, and otherwise prepare the data from the data fusion and integration module 422 for use by the analytics and business intelligence module 430 or the insight and recommendation engine 450. For example, the data preparation and transformation module 428 may be configured to perform the data preparation and segregation operations described above with reference to FIG. 3.

The analytics and business intelligence module 430 may be configured to analyze, interpret, and enable visualization of the data received from the data preparation and transformation module 428. In some implementations, the analytics and business intelligence module 430 may include an analytics engine 432 and a data visualization, analysis, and interpretation module 434. The analytics engine 432 may perform various analysis techniques, such as co-relation, regression, clustering, and the like, on the data received from the data preparation and transformation module 428 to derive information from the derive information from the data. For example, the analytics engine 432 may detect one or more events associated with the equipment asset based on the data, and identify one or more priority events from the detected events, as described above with reference to FIGS. 1 and 2. The analytics engine 432 may also provide the received data and the derived information to the collective intelligence application 440 for use by the insight and recommendation engine 450 in determining insights (e.g., statuses) and recommending maintenance actions. The data visualization, analysis, and interpretation module 434 may be configured to initiate display of one or more GUIs that display representations of the data, in addition to determinations from the insight and recommendation engine 450. The GUIs may enable user interaction to affirm insights, perform maintenance actions, enter additional information, or a combination thereof. The data visualization, analysis, and interpretation module 434 may also monitor the performance of the equipment asset based on performance of the maintenance actions, as well as user input regarding the presented data, for updating information at the data sources 402 or initiating additional training of the insight and recommendation engine 450.

The collective intelligence application 440 may be configured to manage and train one or more ML models accessible to the insight and recommendation engine 450. For example, the collective intelligence application 440 may be configured to initially train candidate ML models and select candidate ML models for use by the insight and recommendation engine 450 or to further train the ML models based on new operating data. Additionally or alternatively, the collective intelligence application 440 may be configured to interface between the insight platform 420 and the insight and recommendation engine 450.

The insight and recommendation engine 450 may be configured to determine insights and recommend maintenance actions based on events received from the insight platform 420. For example, the insight and recommendation engine 450 may include or access one or more ML models to perform the operations described herein. The insight and recommendation engine 450 may determine one or more insights 452 and one or more maintenance actions 454 using one or more ML models. In some implementations, the insight and recommendation engine 450 may include or correspond to the inference engine 128 and the recommendation engine 132 of FIG. 1 or the expert system 204 of FIG. 2. The insights 452 may include a recommended status of the equipment asset that is precursor to a fault (or is indicative of an increase in severity of one or more issues). The insights 452 may be determined using one or more trained ML models that determine statuses (or other insights) based on events, e.g., in some examples—priority events, as described above with reference to FIGS. 1 and 2. The maintenance actions 454 may include one or more actions to be performed by a human, one or more actions to be performed or initiated by the insight platform 420, or a combination thereof, that are configured to provide preventative maintenance to the equipment asset in order to prevent a fault or reduce the severity of other issues. The maintenance actions 454 may be determined using one or more trained ML models that determine maintenance actions based on statuses/insights, as described above with reference to FIGS. 1 and 2. Any or all of the ML models may be trained as described above with reference to FIG. 3, including initial training and model selection, or additional training to dynamically improve the operating of the insight and recommendation engine 450. The insights 452, the maintenance actions 454, or both may be output to the insight platform 420 for display to the user and/or performance of the maintenance actions 454.

As described above, the system 400 may enable automated detection and management of events based on real-time operating condition data associated with an equipment asset, in addition to determination of insights and recommendation of maintenance actions to be performed at the equipment asset. The system 400 may leverage an increased amount of expert knowledge to improve speed of the diagnostics/recommendations, compared to other monitoring systems. Use of the system 400 may reduce (or minimize) the cost of maintenance scheduling and expert help associated with the equipment asset, in some cases by 30% or more. Unplanned downtime of the equipment asset may be reduced, which may result in cost savings to an entity that owns or operates the equipment asset. As a particular example, for a mid-size energy entity operating power equipment, the system 400 may reduce unplanned downtime of the power equipment may be reduced by 50%, which may result in $50-100 million in savings to the entity. Additionally or alternatively, recommendations of the maintenance actions by the system 400 may have a positive impact on enterprise processes of the entity, such as financial procurement, inventory management, etc. The knowledge base (e.g., the data) may be maintained and monetized, such as being provided as a service to end customers of the entity, or even competitors of the entity.

The following describes a particular example of use of any of the system 100 of FIG. 1, the system 200 of FIG. 2, or the system 400 of FIG. 4, each of which may be trained according to the method 300 of FIG. 3. In this example, the equipment asset is a control valve of a liquid natural gas (LNG) plant operated by a gas company. Sensors configured to monitor the control valve may provide operating characteristics data to be used to recommend insights (e.g., statuses) of the control valve. To begin, exploratory data analysis (EDA) may be performed on operating characteristics data to find data points and clean the data. Next, descriptive analysis may be performed to determine distributions of different features and determine different insights that are provided based on the operating characteristics/conditions. In this particular example, eleven different insights/statuses are identified, in addition to corresponding frequencies of occurrence, as shown below in Table 3.

TABLE 3

Example Insights for a Control Valve

| No. | Insight/Status | Frequency |
|---|---|---|
| 1 | Normal operation | 1370 |
| 2 | Noise and vibrations due to unfavorable change in flow rates and pressure | 32 |
| 3 | Leakage in the system poses potential safety risks to the system and environmental hazards | 32 |
| 4 | Valve leakage refers to flow through a valve which is set in the 'off' state | 23 |
| 5 | Fugitive emissions leak from the valve into the atmosphere, posing potential environmental and safety hazards | 12 |
| 6 | Valve is subjected to mechanical stress due to undesirable temperature | 10 |
| 7 | Martensitic transformation begins where lower temperature degrades the valve assembly | 5 |
| 8 | The pressure swings can cause cycling of the whole plant, leading to wear and tear in the mechanical equipment | 5 |
| 9 | Formation of debris/ice in the flow line | 4 |
| 10 | If the valve cannot accurately maintain the inlet pressure to the plant, cycling may occur | 3 |
| 11 | This process instability can reduce the amount of throughput of flowing material and affect the ability for the plant to meet its quota | 2 |

As shown by Table 3, the 'normal operation' class has a very high frequency when compared to other classes of insights, due to which the data highly skews toward normal operation. Different features extracted from the operating characteristics data, such as temperature, inlet pressure, pressure drop, and leakage, may vary significantly within these eleven groups of insights. Such variation may provide understanding how each feature influences the insight. For example, the insight 'mechanical stress' may occur only when the temperature is very high (e.g., around 145° C.). Similarly, the insight 'noise and vibration' may occur only when the pressure drop is very high (e.g., around a value of 500 PSI). These relationships may be evident by comparing the frequency of the various insight classes for different values of the features. Similar variations and differences can be identified for each of the feature and insight classes, which indicates the relationship between the input features and the insight class (e.g., the target feature). Correlation analysis may also indicate the strength of linear relationships between different variables.

After completion of the EDA, feature engineering may be performed to derive more features from the available features. The feature engineering performed in this particular example is based on textual features, which may be processed using NLP such as tokenization lemmatization, etc. In the particular example, bag of words modelling is used as it performed better than other NLP techniques. After the bag of words modelling, correlation analysis may be performed to assess the strength of relationships for all existing and derived features. Features that have little or no correlation to insights may be dropped as part of feature selection. In this particular example, operational features (e.g., numerical features) and features generated from the bag of words modelling are summarized below in Table 4. For these textual features, it is shown that three words are considered together, because in this implementation one of the inputs to the bag of words modelling is 'Ngram'—the number of words to be considered together (e.g., three in this example). The features extracted from the text may be one-hot encoded to convert the features to numerical features that can be consumed by the ML models.

TABLE 4

Example Features
Features Considered

| | |
|---|---|
| Opr_Temperature | Operational Features |
| Opr_Inlet_Pressure | |
| Opr_Pressure_Drop | |
| Opr_Leakage_Rate | |
| leakage cross the | NLP Features from Event Description |
| pressure drop increase | |
| pressure exceed the | |
| temperature variation for | |

One important aspect to note in classification problems before ML model training is the train-test-validation split. This split should ensure that data points from all the classes should be available in all three sets as much as possible. This ensures that the results obtained on the test data may be acceptable for new unseen real-time data as well. In this particular example, a k-fold cross-validation technique is used with a value of k=5 for training the ML models, and 30% of the data is designated as the test data. Any classification algorithm, such as random forest, NB, etc., may be used to train the ML models. In this particular example, SVMs and NBs are used, and the SVMs used for model training may be optimized with random search techniques to identify the best set of hyper-parameters for the given data. Example hyper-parameter values are shown in Table 5 below.

TABLE 5

Example Hyper-Parameter Values

| Hyper-Parameter | Values |
|---|---|
| gamma | 1, .1, .01, .001, .0001 |
| kernel | Radial bias |
| C | .1, 1, 10, 100, 1000 |

Example evaluation metrics based on test data are shown below in Table 6, and example confidence levels of the predictive models used for insight recommendation are shown below in Table 7.

TABLE 6

Example Evaluation Metrics

| Metrics | SVM | NB |
|---|---|---|
| Sensitivity | 0.54 | 0.51 |
| Specificity | 0.991 | 0.99 |
| Accuracy | 0.957 | 0.940 |

TABLE 7

Example Confidence Levels
Confidence Levels

| | Models | | | |
|---|---|---|---|---|
| | SVM | | NB | |
| | Range | | | |
| Classes | Max | Min | Max | Min |
| Normal Operation | 0.99 | 0.276 | 1 | 0.529 |
| Other Classes | 0.99 | 0.276 | 1 | 0.529 |

In this particular example, maintenance actions may also be recommended based on the events and insights. A similar EDA approach may be followed for action recommendation as was followed for insight recommendation. The descriptive analysis may be performed to find distributions of different features and the number of different actions. In this particular example, eighteen different actions are identified based on the operating conditions, the detected events, and the corresponding insights. The actions, and their corresponding frequencies, are shown in Table 8 below.

TABLE 8

Example Actions for a Control Valve

| No. | Actions | Frequency |
|---|---|---|
| 1 | Normal Operation | 1370 |
| 2 | Select the appropriate valve size. Oversizing is one of the most common causes of valve leakage, particularly for control valves. Have a tight shut-off. | 20 |
| 3 | Add a diffuser downstream of the control valve. Diffuser will take the pressure drop that is in excess of the choked flow pressure. | 15 |
| 4 | Record leakage data using flow meter or count bubbles; determine if leakage is because of bad seats or damaged ball. Return damaged seat for evaluation; replace soft seats as necessary. | 13 |
| 5 | Select the appropriate valve size. Oversizing is one of the most common causes of valve leakage, particularly for control valves. | 12 |
| 6 | Use trim; In a V-notch, segmented ball valve trim is made up of a ball and shaft, and a seal ring or a seat ring. In a butterfly valve it is the disc and seal ring. Have a tight shut-off; conduct different leakage tests. | 11 |
| 7 | Valve piping insulation is recommended. | 11 |
| 8 | Put a trim - valve material and trim material WCC with 316 SST/Alloy 6 (NACE) - Trim type Whisper trim or Whisper III trim. | 6 |
| 9 | Add a noise attenuation trim. | 6 |
| 10 | Provide insulation to the equipment. | 5 |
| 11 | Surface hardening treatment - it will prevent wear and improve durability. | 5 |
| 12 | Add extension bonnet which provides efficient cold insulation, minimizes heat conditions and transfers from cryogenic. | 5 |
| 13 | Add a noise abatement trim with shut-off requirement: ANSI class IV or V - Trim type: Whisper III trim or Whisper trim. | 4 |
| 14 | Feed an antifreeze solution into the flow stream. | 4 |
| 15 | Control the flow rate using distributed control system (DCS) with pressure readings from transmitters in a triple voting configuration. | 3 |
| 16 | Check proper functioning of neighboring equipment which affects the functioning of valve, for example pumps, heat exchangers, and compressors. | 3 |
| 17 | Ask maintenance officer to perform lambda tuning of the level loops - this will prevent oscillation and absorb disturbances instead of propagating them. | 2 |
| 18 | Ask operator to check proper sizing of valve. | 2 |

The variation of the features, such as temperature, inlet pressure, pressure drop, and leakage rate, within these eighteen classes of actions may be analyzed to determine how each feature influences the actions. For example, the action 'add diffuser' may occur only when the pressure drop is very high (e.g., around a value of 500 PSI). As another example, the action 'RightSize Shutoff' may only occur when the leakage is very high. Similar variations and differences can be identified for each of the features and the actions, thereby indicating the relationship between the features and the action. Correlation analysis may be performed to determine the strength of linear relationships between different variables.

After performing EDA, feature engineering may be performed to derive additional features from the extracted features. The feature engineering performed in this particular example is based on textual features, which may be processed using NLP. As described above, in this particular example, bag of words modelling is used. After the bag of words modelling, correlation analysis may be performed to assess the strength of relationships for all existing and derived features. Features that have little or no correlation to insights may be dropped as part of feature selection. In this particular example, operational features (e.g., numerical features) and features generated from the bag of words modelling are summarized below in Table 9. The features extracted from the text may be one-hot encoded to convert the features to numerical features that can be consumed by the ML models.

TABLE 9

Example Features Considered
Features Considered

| | |
|---|---|
| Opr_Pressure_Drop | Operational Features |
| Opr_Leakage_Rate | |
| leakage cross the | NLP Features from Event |
| pressure drop increase | Descriptions |
| pressure exceed the | |
| due to unfavorable change in flow | NLP Features from Insight |
| valve be subject to mechanical stress | Descriptions |
| the system pose potential safety risk | |
| leakage refer to flow through valve | |
| fugitive emissions leak from the valve | |

In this particular example, the train-test-validation split is configured in such a way as to have representative examples from each of the classes in all the train-test-validation sets. Additionally, 30% of the data is designated as the test data. In this particular example, NBs are used as the ML models. Example evaluation metrics based on test data are shown below in Table 10 below, and example confidence levels of the predictive models used for insight recommendation are shown below in Table 11 below.

TABLE 10

Example Evaluation Metrics

| Metrics | NB |
|---|---|
| Sensitivity | 0.6 |
| Specificity | 0.996 |
| Accuracy | 0.98 |

TABLE 11

Example Confidence Levels
Confidence Level

| Classes | Models NB Range | |
|---|---|---|
| | Max | Min |
| Normal Operation | 1 | 0.55 |
| Other Classes | 1 | 0.55 |

Based on the above operations, insights and maintenance actions may be recommended based on operational conditions and event descriptions. The success of the recommendations may be improved with continuous or periodic feed of priority events as part of the process. Similarly, priority/worthy events may be identified based on the data available. Thus, using these techniques, insights and maintenance actions can be recommended, and priority events can be identified further and priorities for further actions in a closed feedback loop to the users. In some implementations, the maintenance actions may be performed by the system remotely via communication with a control system of the equipment asset. For example, a control the flow rate action, once affirmed by the user, may be initiated by the system automatically generating an instruction that is provided to the control system for performance at the equipment asset, such as using a computer-to-machine interface that automatically controls the flow rate.

Figure 5:
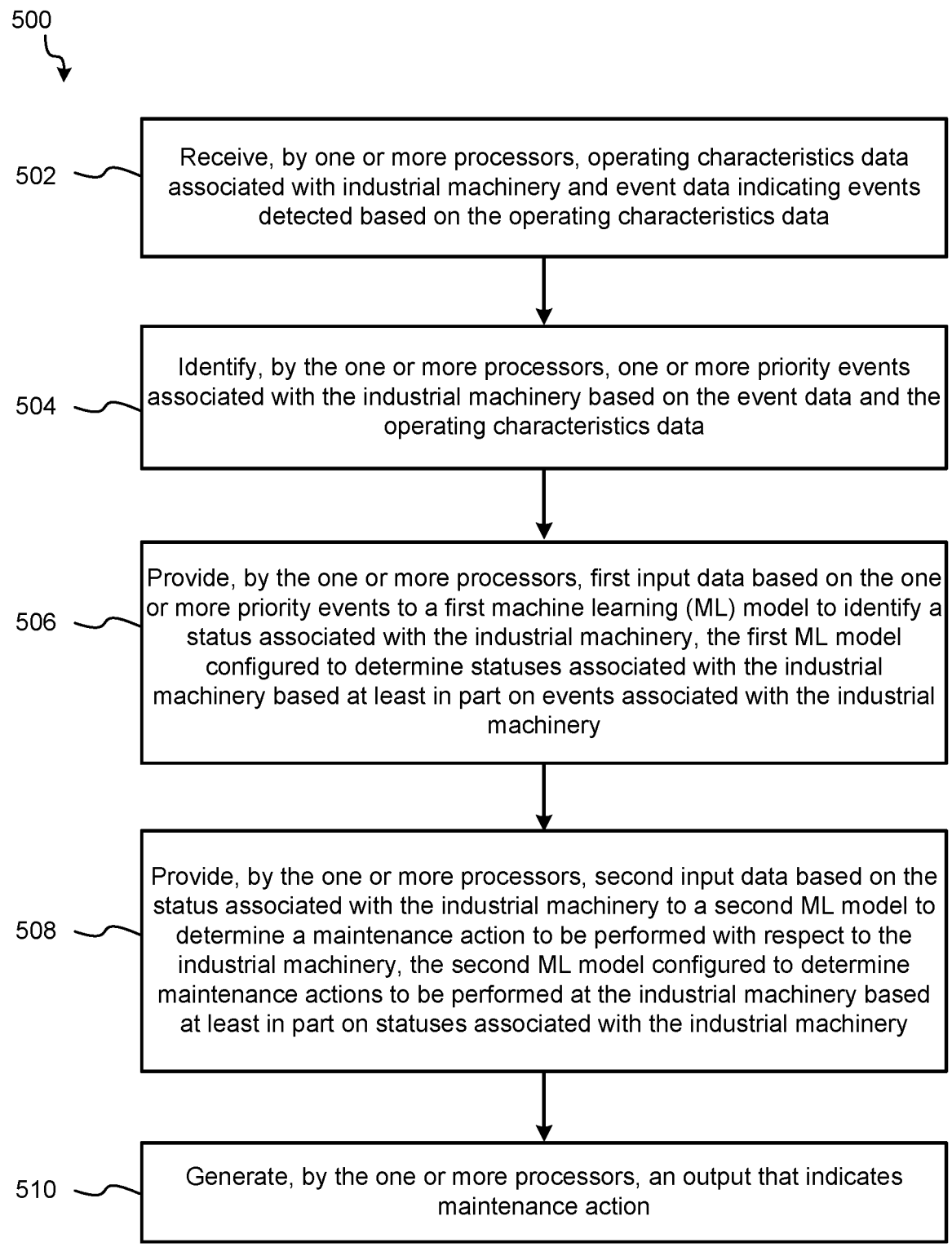
FIG. 5 is a flow diagram illustrating an example of a method for event categorization and maintenance action recommendation using machine learning according to one or more aspects.

Referring to FIG. 5, a flow diagram of an example of a method for event categorization and maintenance action recommendation using machine learning according to one or more aspects is shown as a method 500. In some implementations, the operations of the method 500 may be stored as instructions that, when executed by one or more processors (e.g., the one or more processors of a monitoring device or a server), cause the one or more processors to perform the operations of the method 500. In some implementations, the method 500 may be performed by a computing device, such as the monitoring device 102 of FIG. 1 (e.g., a computer device configured for event categorization and maintenance action determination), one or more components of the system 200 of FIG. 2, one or more components of the system 400 of FIG. 4, or a combination thereof. Although described in the context of industrial machinery, the method 500 may also apply to any type of equipment asset.

The method 500 includes receiving operating characteristics data associated with industrial machinery and event data indicating events detected based on the operating characteristics data, at 502. For example, the operating characteristics data may include or correspond to the operating characteristics data 136 of FIG. 1, and the event data may include or correspond to the events 110. The method 500 also includes identifying one or more priority events associated with the industrial machinery based on the event data and the operating characteristics data, at 504. For example, the one or more priority events may include or correspond to the priority events 112 of FIG. 1.

The method 500 includes providing first input data based on the one or more priority events to a first ML model to identify a status associated with the industrial machinery, at 506. The first ML model is configured to determine statuses associated with the industrial machinery based at least in part on events associated with the industrial machinery. For example, the first ML model may include or correspond to ML models 130, and the status may include or correspond to status 114 of FIG. 1.

The method 500 includes providing second input data based on the status to a second ML model to determine a maintenance action to be performed with respect to the industrial machinery, at 508. The second ML model is configured to determine maintenance actions to be performed at the industrial machinery based at least in part on statuses associated with the industrial machinery. For example, the second ML model may include or correspond to ML models 134, and the maintenance action may include or correspond to maintenance actions 116 of FIG. 1. The method 500 also includes generating an output that indicates maintenance action, at 510. For example, the output may include or correspond to the output 138 of FIG. 1.

In some implementations, the method 500 may also includes initiating, based on the output, display of a GUI that indicates the maintenance action. For example, the monitoring device 102 of FIG. 1 may provide the output 138 to the display device 140 to initiate display of a GUI at the display device 140. Additionally or alternatively, the method 500 may also include initiating, based on the output, performance of the maintenance action. In some such implementations, the output may include an instruction to perform the maintenance action, and the method 500 may further include initiating transmission of the instruction to a control device for the industrial machinery. For example, the monitoring device 102 of FIG. 1 may provide the output 138 as an instruction to a control device or system of the equipment asset 150 to initiate performance of the maintenance actions 116. Additionally or alternatively, a data source may be configured to store historical equipment asset data, a control device for the equipment asset, a user device, a knowledge database configured to store event data, status data, and maintenance action data for the equipment asset, ranking data (for the events, the maintenance actions, or both), or a combination thereof. For example, the data source 154 of FIG. 1 may be configured to store at least the historical operating data 156.

In some implementations, the method 500 may also include extracting first numerical features from the operating characteristics data, performing natural language processing on text data of the operating characteristics data to convert the text data to second numerical features, or a combination thereof. The one or more priority events may be based on the first numerical features, the second numerical features, or a combination thereof. For example, the operating characteristics data 136 may be processed for feature extraction as further described above with reference to FIG. 3. In some such implementations, the method 500 may further include pre-processing the operating characteristics data prior to extracting the first numerical features or performing the natural language processing, performing dimensionality reduction on at least one of the first numerical features and the second numerical features prior to generating the first input data, or a combination thereof. The pre-processing includes performing statistical analysis on the operating characteristics data to remove or modify an outlier from the operating characteristics data, removing an entry from the operating characteristics data that is associated with a variance that fails to satisfy a variance threshold, formatting the operating characteristics data, approximating a missing entry of the operating characteristics data, or a combination thereof.

In some implementations, the method 500 may also include generating training data based on results of performance of the maintenance action, and further training the second ML model based on the training data. For example, the training data may include or correspond to the additional training data 120 of FIG. 1. Additionally or alternatively, the method 500 may further include generating event-status-action data associated with the industrial machinery based on historical operating characteristics data associated with the industrial machinery, historical event data associated with the industrial machinery, work orders associated with the industrial machinery. The event-status-action data may be categorized based on user input, one or more automated statistical analysis operations, or a combination thereof. For example, the event-status-action data may include or correspond to the equipment asset analysis data 160 of FIG. 1.

In some implementations, identifying the one or more priority events may include providing third input data based on the event data and the operating characteristics data to a third ML model to determine the one or more priority events. The third ML model is configured to cluster events into categories of events. For example, the third ML model may include or correspond to the ML models 126 of FIG. 1. Additionally or alternatively, the method 500 may also include initiating display of the status associated with the industrial machinery, the one or more priority events, a representation of at least a portion of the operating characteristics data, or a combination thereof. For example, the monitoring device 102 of FIG. 1 may provide the output 138 to the display device 140 to initiate display of the status 114, the priority events 112, at least a portion of the operating characteristics data 136, or a combination thereof. In some such implementations, the method 500 may further include receiving a user input responsive to the display and generating the second input data based on the status associated with the industrial machinery and at least a portion of the operating characteristics data. The user input indicates affirmation of the status associated with the industrial machinery. For example, the monitoring device 102 may receive user input from the user device 162 that indicates affirmation of the status 114. Additionally or alternatively, the first ML model may be trained using first training data based on labelled historical event data associated with the industrial machinery, labelled historical event data associated with other industrial machinery, equipment specifications associated with the industrial machinery, historical status data associated with the industrial machinery, or a combination thereof, and labels of the respective labelled historical event data may indicate observed statuses (e.g., insights) of the industrial machinery that correspond to the respective labelled historical event data. For example, the ML models 130 of FIG. 1 may be trained using the training data 118 that is based on the historical operating data 156 or the equipment asset analysis data 160.

In some implementations, the first ML model may be trained using first training data based on labelled historical operating characteristics data associated with the industrial machinery, labelled historical operating characteristics data associated with other industrial machinery, labelled historical event data associated with the industrial machinery, historical status data associated with the industrial machinery, or a combination thereof, and labels of the respective labelled historical operating characteristics data may indicate observed statuses (e.g., insights) corresponding to the respective labelled historical operating characteristics data. For example, the ML models 126 of FIG. 1 may be trained using the training data 118 that is based on the historical operating data 156 or the equipment asset analysis data 160. Additionally or alternatively, the second ML model may be trained using second training data based on labelled historical status data associated with the industrial machinery, labelled historical status associated with other industrial machinery, historical work orders associated with the industrial machinery, labelled historical status data associated with the industrial machinery, or a combination thereof, and labels of the labelled historical status data may indicate maintenance actions corresponding to the statuses of the respective labelled historical status. For example, the ML models 134 of FIG. 1 may be trained using the training data 118 that is based on the historical operating data 156 or the equipment asset analysis data 160.

In some implementations, the method 500 may also include displaying the status associated with the industrial machinery, receiving user input responsive to the display (the user input indicating a modification to the status), and modifying the status associated with the equipment asset based on the user input prior to determining the maintenance action. For example, the inference engine 128 may modify the status 114 of FIG. 1 based on user input from a user device responsive to display of the status 114 to a user. Additionally or alternatively, the method 500 may also include generating training data based on features extracted from additional operating characteristics data received responsive to performance of the maintenance action, and further training the first ML model, the second ML model, or a combination thereof, based on the training data. For example, the training data may include or correspond to the additional training data 120 of FIG. 1.

It is noted that other types of devices and functionality may be provided according to aspects of the present disclosure and discussion of specific devices and functionality herein have been provided for purposes of illustration, rather than by way of limitation. It is noted that the operations of the method 300 of FIG. 3 and the method 500 of FIG. 5 may be performed in any order, or that operations of one method may be performed during performance of another method, such as the method 500 of FIG. 5 including one or more operations of the method 300 of FIG. 3. It is also noted that the methods 300 of FIG. 3 and the method 500 of FIG. 5 may also include other functionality or operations consistent with the description of the operations of the system 100 of FIG. 1, the system 200 of FIG. 2, and/or the system 400 of FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-5) may comprise processors, electronics devices, hardware devices, electronics components, logical circuits, memories, software codes, firmware codes, etc., or any combination thereof. In addition, features discussed herein relating to FIGS. 1-5 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-5) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be implemented directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this disclosure. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one aspect or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

What is claimed is:

1. A method for event categorization and maintenance action determination using machine learning, the method comprising:
receiving, by one or more processors, operating characteristics data associated with industrial machinery and event data indicating events detected based on the operating characteristics data;
identifying, by the one or more processors, one or more priority events associated with the industrial machinery based on the event data and the operating characteristics data;
providing, by the one or more processors, first input data based on the one or more priority events and the operating characteristics data to a first machine learning (ML) model to identify a status associated with the industrial machinery, the first ML model configured to determine statuses associated with the industrial machinery based at least in part on events associated with the industrial machinery;

providing, by the one or more processors, second input data based on the status associated with the industrial machinery to a second ML model to determine a maintenance action to be performed with respect to the industrial machinery, the second ML model configured to determine maintenance actions to be performed at the industrial machinery based at least in part on statuses associated with the industrial machinery; and generating, by the one or more processors, an output that indicates maintenance action.

2. The method of claim 1, further comprising initiating, by the one or more processors and based on the output, display of a graphical user interface (GUI) that indicates the maintenance action.

3. The method of claim 1, further comprising initiating, by the one or more processors and based on the output, performance of the maintenance action.

4. The method of claim 1, further comprising:
extracting, by the one or more processors, first numerical features from the operating characteristics data;
performing, by the one or more processors, natural language processing on text data of the operating characteristics data to convert the text data to second numerical features; or
a combination thereof,
wherein the one or more priority events are based on the first numerical features, the second numerical features, or a combination thereof.

5. The method of claim 4, further comprising:
pre-processing, by the one or more processors, the operating characteristics data prior to extracting the first numerical features or performing the natural language processing,
the pre-processing including performing statistical analysis on the operating characteristics data to remove or modify an outlier from the operating characteristics data, removing an entry from the operating characteristics data that is associated with a variance that fails to satisfy a variance threshold, formatting the operating characteristics data, approximating a missing entry of the operating characteristics data, or a combination thereof,
performing, by the one or more processors, dimensionality reduction on at least one of the first numerical features and the second numerical features prior to generating the first input data; or
a combination thereof.

6. The method of claim 1, further comprising generating event-status-action data associated with the industrial machinery based on historical operating characteristics data associated with the industrial machinery, historical event data associated with the industrial machinery, work orders associated with the industrial machinery, historical status information associated with the industrial machinery, or a combination thereof,
wherein the event-status-action data is categorized based on user input, one or more automated statistical analysis operations, or a combination thereof.

7. The method of claim 1, further comprising:
generating, by the one or more processors, training data based on results of performance of the maintenance action; and
further training, by the one or more processors, the second ML model based on the training data.

8. The method of claim 1, wherein identifying the one or more priority events comprises:
providing, by the one or more processors, third input data based on the event data and the operating characteristics data to a third ML model to determine the one or more priority events,
the third ML model configured to cluster events into categories of events.

9. The method of claim 1, further comprising:
initiating, by the one or more processors, display of the status associated with the industrial machinery, the one or more priority events, a representation of at least a portion of the operating characteristics data, or a combination thereof.

10. The method of claim 9, further comprising:
receiving, by the one or more processors, a user input responsive to the display,
the user input indicating affirmation of the status associated with the industrial machinery; and
generating, by the one or more processors, the second input data based on the status associated with the industrial machinery and at least a portion of the operating characteristics data.

11. The method of claim 1, wherein:
the first ML model is trained using first training data based on labelled historical event data associated with the industrial machinery, labelled historical event data associated with other industrial machinery, equipment specifications associated with the industrial machinery, historical status data associated with the industrial machinery, or a combination thereof, and
labels of the respective labelled historical event data indicate observed statuses of the industrial machinery that correspond to the respective labelled historical event data.

12. A non-transitory computer-readable storage medium storing instructions that, when executed by one or more processors, cause the one or more processors to perform operations for event categorization and maintenance action determination using machine learning, the operations comprising:
receiving operating characteristics data associated with industrial machinery and event data indicating events detected based on the operating characteristics data;
identifying one or more priority events associated with the industrial machinery based on the event data and the operating characteristics data;
providing first input data based on the one or more priority events to a first machine learning (ML) model to identify a status associated with the industrial machinery,
the first ML model configured to determine statuses associated with the industrial machinery based at least in part on events associated with the industrial machinery;
providing second input data based on the status associated with the industrial machinery to a second ML model to determine a maintenance action to be performed with respect to the industrial machinery,
the second ML model configured to determine maintenance actions to be performed at the industrial machinery based at least in part on statuses associated with the industrial machinery; and generating an output that indicates maintenance action.

13. The non-transitory computer-readable storage medium of claim 12, wherein:

the first ML model is trained using first training data based on labelled historical operating characteristics data associated with the industrial machinery, labelled historical operating characteristics data associated with other industrial machinery, labelled historical event data associated with the industrial machinery, historical status data associated with the industrial machinery, or a combination thereof, and labels of the respective labelled historical operating characteristics data indicate observed statuses corresponding to the respective labelled historical operating characteristics data.

14. The non-transitory computer-readable storage medium of claim 12, wherein:

the second ML model is trained using second training data based on labelled historical status data associated with the industrial machinery, labelled historical status data associated with other industrial machinery, historical work orders associated with the industrial machinery, labelled historical status data associated with the industrial machinery, or a combination thereof, and labels of the labelled historical status data indicate maintenance actions corresponding to the labelled historical status data.

15. The non-transitory computer-readable storage medium of claim 12, wherein:

the output includes an instruction to perform the maintenance action, and the operations further comprise initiating transmission of the instruction to a control device for the industrial machinery.

16. A system for event categorization and maintenance action determination using machine learning, the system comprising:

a memory; and one or more processors communicatively coupled to the memory, the one or more processors configured to:

receive operating characteristics data associated with an equipment asset and event data indicating events detected based on the operating characteristics data;

identify one or more priority events associated with the equipment asset based on the event data and the operating characteristics data;

provide first input data based on the one or more priority events to a first machine learning (ML) model to identify a status associated with the equipment asset, the first ML model configured to determine statuses associated with the equipment asset based at least in part on events associated with the equipment asset;

provide second input data based at least in part on the status associated with the equipment asset to a second ML model to determine a maintenance action to be performed with respect to the equipment asset, the second ML model configured to determine maintenance actions to be performed at the equipment asset based at least in part on statuses associated with the equipment asset; and generate an output that indicates maintenance action.

17. The system of claim 16, further comprising an interface configured to enable communication with a data source configured to store historical equipment asset data, a control device for the equipment asset, a user device, a knowledge database configured to store event data, status data, and maintenance action data for the equipment asset, or a combination thereof.

18. The system of claim 16, wherein the one or more processors are further configured to:

provide the output to a display device for display of the maintenance action;

initiate performance of the maintenance action based on the output; or a combination thereof.

19. The system of claim 16, wherein the one or more processors are further configured to:

initiate display of the status associated with the equipment asset;

receive user input responsive to the display, wherein the user input indicates a modification to the status; and modify the status associated with the equipment asset based on the user input prior to determining the maintenance action.

20. The system of claim 16, wherein the one or more processors are further configured to:

generate training data based on features extracted from additional operating characteristics data received responsive to performance of the maintenance action; and further train the first ML model, the second ML model, or a combination thereof, based on the training data.

* * * * *